United States Patent
Jia

(10) Patent No.: US 12,113,584 B2
(45) Date of Patent: Oct. 8, 2024

(54) RADIO FREQUENCY RECEIVING LINK AND RADIO FREQUENCY TRANSCEIVING DEVICE

(71) Applicant: SANECHIPS TECHNOLOGY CO., LTD., Shenzhen (CN)

(72) Inventor: Chengwei Jia, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 367 days.

(21) Appl. No.: 17/777,425

(22) PCT Filed: Nov. 18, 2020

(86) PCT No.: PCT/CN2020/129754
§ 371 (c)(1),
(2) Date: May 17, 2022

(87) PCT Pub. No.: WO2021/098718
PCT Pub. Date: May 27, 2021

(65) Prior Publication Data
US 2023/0029747 A1      Feb. 2, 2023

(30) Foreign Application Priority Data
Nov. 18, 2019   (CN) .......................... 201911129972.X

(51) Int. Cl.
*H04B 17/21*   (2015.01)
*H04B 1/16*    (2006.01)

(52) U.S. Cl.
CPC ............... *H04B 17/21* (2015.01); *H04B 1/16* (2013.01)

(58) Field of Classification Search
CPC . H04B 17/21; H04B 1/16; H04B 1/30; H04B 1/10; H04B 17/11; H04B 1/40; H04B 2001/305
See application file for complete search history.

(56) References Cited

U.S. PATENT DOCUMENTS

| | | | |
|---|---|---|---|
| 10,224,910 B1* | 3/2019 | Chang | H03G 3/001 |
| 10,382,087 B1* | 8/2019 | Dror  | H04B 1/525 |

(Continued)

FOREIGN PATENT DOCUMENTS

| | | | |
|---|---|---|---|
| CN | 1531215 A    | * | 9/2004 |
| CN | 101507153 A  |   | 8/2009 |

(Continued)

OTHER PUBLICATIONS

International Search Report for corresponding application PCT/CN2020/129754 filed Nov. 18, 2020; Mail date Jan. 20, 2021.

*Primary Examiner* — Angelica Perez
(74) *Attorney, Agent, or Firm* — CANTOR COLBURN LLP

(57) ABSTRACT

A radio frequency receiving link and a radio frequency transceiving device are provided. The radio frequency receiving link includes: an input unit, configured to input a first input signal; a clock unit, configured to generate a local oscillator signal; a receiving link frequency-mixing unit, configured to obtain the first input signal and the local oscillator signal, and generate a first frequency-mixing signal according to the first input signal and the local oscillator signal; and a calibration unit, configured to obtain first direct current offset information of the radio frequency receiving link, wherein the first direct current offset information is direct current offset information in the radio frequency receiving link when the receiving link frequency-mixing unit generates the first frequency-mixing signal.

20 Claims, 5 Drawing Sheets

(56) References Cited

U.S. PATENT DOCUMENTS

| | | | |
|---|---|---|---|
| 2005/0184801 A1 | 8/2005 | Gai | |
| 2006/0222117 A1* | 10/2006 | Rahman | H03D 3/008 375/345 |
| 2015/0288467 A1* | 10/2015 | Kahrizi | H04B 17/21 370/241 |
| 2016/0173048 A1* | 6/2016 | Waheed | H04B 17/21 375/345 |

FOREIGN PATENT DOCUMENTS

| | | |
|---|---|---|
| CN | 10947455 A | 3/2019 |
| EP | 1331742 A2 | 7/2003 |

* cited by examiner

Fig. 7

| Obtain the first direct current offset information of the radio frequency receiving link, wherein he first direct current offset information is direct current offset information in the radio frequency receiving link when the receiving link frequency-mixing unit generates the first frequency-mixing signal, and the first frequency-mixing signal is a frequency-mixing signal obtained by the receiving link frequency-mixing unit according to the first input signal input by the input unit and the local oscillator signal generated by the clock unit | S202 |

| Obtain the second direct current offset information of the radio frequency receiving link, wherein the second direct current offset information is direct current offset information in the radio frequency receiving link when the receiving link frequency-mixing unit generates the second frequency-mixing signal, the second frequency-mixing signal is a frequency-mixing signal generated by the receiving link frequency-mixing unit according to the second input signal and the local oscillator signal, and the second input signal is input by the input unit according to the first input signal and the local oscillator signal | S204 |

| Perform frequency calibration for the radio frequency receiving link according to the first direct current offset information and the second direct current offset information | S206 |

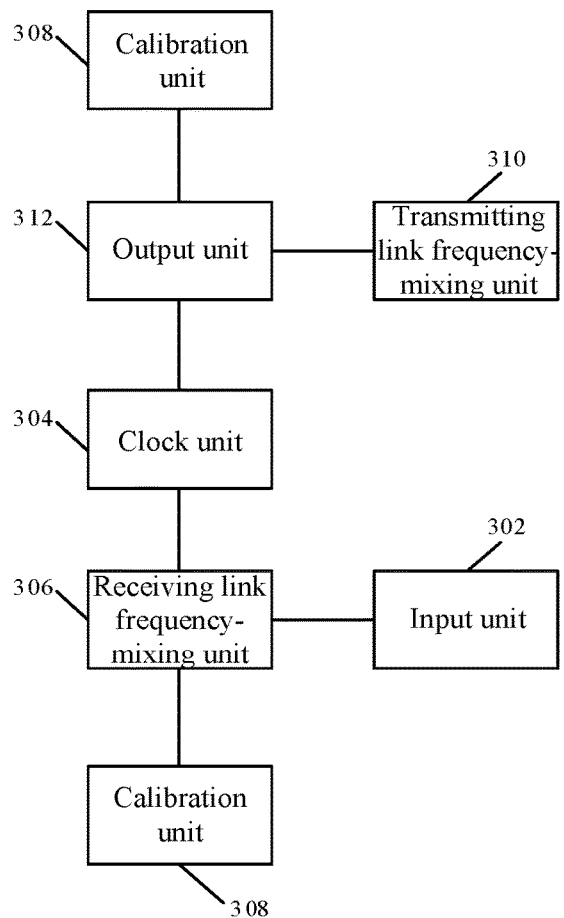

| Obtain the first direct current offset information of the radio frequency receiving link, wherein the first direct current offset information is direct current offset information in the radio frequency receiving link when the receiving link frequency-mixing unit generates the first frequency-mixing signal, and the first frequency-mixing signal is a frequency-mixing signal obtained by the receiving link frequency-mixing unit according to the first input signal input by the input unit and the local oscillator signal generated by the clock unit | S402 |

| Obtain the fifth direct current offset information of the radio frequency receiving link, wherein the fifth direct current offset information is direct current offset information in the radio frequency receiving link when the receiving link frequency-mixing unit generates the fourth frequency-mixing signal, the fourth frequency-mixing signal is a frequency-mixing signal generated by the receiving link frequency-mixing unit according to the third input signal and the local oscillator signal, the third input signal is input by the input unit according to the first input signal and the output signal output by the output unit in the radio frequency transmitting link, the output signal is obtained by the input unit according to the third frequency-mixing signal generated by the transmitting link frequency-mixing unit, and the third frequency-mixing signal is the frequency-mixing signal generated by the transmitting link frequency-mixing unit according to the preset analog signal, the local oscillator signal and the preset fourth direct current offset information | S404 |

Perform frequency calibration for the radio frequency transmitting link according to the first direct current offset information and the fifth direct current offset information — S406

Fig. 12

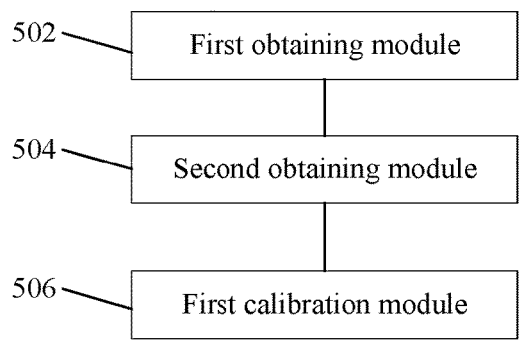

Fig. 13

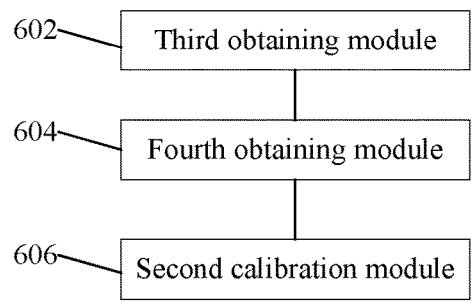

RADIO FREQUENCY RECEIVING LINK AND RADIO FREQUENCY TRANSCEIVING DEVICE

CROSS REFERENCE

This application is a National Stage Filing of the PCT International Application No. PCT/CN2020/129754 filed on Nov. 18, 2020, which claims priority to Chinese Application No. 201911129972.X filed on Nov. 18, 2019, the entirety of which is herein incorporated by reference.

TECHNICAL FIELD

The present disclosure relates to the field of communications, and in particular to a radio frequency receiving link and a radio frequency transceiving device.

BACKGROUND

In the design of a multi-band radio frequency transceiver, frequency-selection characteristics of receiving and transmitting links of the radio frequency transceiver have a great impact on system performance. In a process of simulation and test of a radio frequency transceiver chip, there is a frequency-selection characteristic deviation between a simulation result and a test result of the chip due to factors such as process model deviation and package parasitic wiring. Influences caused by the above problem in low frequency bands are tolerable, but in high frequency bands, factors such as the process model deviation and the package parasitic usually cause a GHz-level deviation between the frequency band of the receiving and transmitting links and a simulation value, which in turn brings the following consequences. 1) According to a noise cascade formula, a frequency band deviation will cause decrease in the gain of the receiving and transmitting links in the actual operating frequency band, and deterioration in in-band signal-to-noise ratio (SNR) and signal intensity. 2) After the frequency band deviates, the gain of a neighboring channel or secondary neighboring channel is increased, the interference suppression capability of the receiving link for the neighboring channel or the secondary neighboring channel is reduced, and an interference signal generated by the transmitting link on the neighboring channel or the secondary neighboring channel becomes strong. 3) The consistency of different chips is poor, which causes a difficulty in controlling the chip quality and a significant drop in yield. Therefore, it is necessary to calibrate the operating frequency band of the receiving and transmitting links in the process of simulation and test of a radio frequency transceiver chip.

In the related art, a power detector is usually used to calibrate the radio frequency receiving and transmitting links. FIG. 1 is a circuit diagram of using a power detector to perform frequency calibration for a radio frequency transceiver provided according to the related art. As shown in FIG. 1, in the related art, an accurate frequency point is locked through a clock circuit Phase-Locked Loop (PLL), and a capacitance parameter is tuned to form a peak output; the capacitance parameter called by peak detection is used for calibrating a Low Noise Amplifier (LNA) to achieve the accurate resonance of the LNA in a radio frequency band. However, for the manner of calibrating the radio frequency of the radio frequency transceiver in the related art as shown in FIG. 1, on the one hand, it is difficult to realize the high-precision power detector in the high frequency band, so it is difficult to realize the power detector with a good performance; on the other hand, a control word of capacitor arrays between the clock circuit and the power detector directly controls the tuner capacitance of a Phase Shifter (PS) in the radio frequency receiving link, there is an inevitable mismatch between the two capacitor arrays, which will cause a frequency tuning error in a calibration process to become larger, especially in the high frequency band, the frequency tuning error becomes larger obviously.

For the problem in the related art that efficient frequency calibration cannot be implemented for a receiving link in a radio frequency transceiver, no effective solution has been proposed in the related art.

SUMMARY

Embodiments of the present disclosure provide a radio frequency receiving link and a radio frequency transceiving device, which can at least solve the problem in the related art that efficient frequency calibration cannot be implemented for a receiving link in a radio frequency transceiver.

According to an embodiment of the present disclosure, a radio frequency receiving link is provided, which includes: an input unit, a clock unit, a receiving link frequency-mixing unit and a calibration unit.

The input unit is configured to input a first input signal.

The clock unit is configured to generate a local oscillator signal.

The receiving link frequency-mixing unit is configured to obtain the first input signal and the local oscillator signal, and generate a first frequency-mixing signal according to the first input signal and the local oscillator signal.

The calibration unit is configured to obtain first direct current offset information of the radio frequency receiving link. The first direct current offset information is direct current offset information in the radio frequency receiving link when the receiving link frequency-mixing unit generates the first frequency-mixing signal.

The receiving link frequency-mixing unit is further configured to obtain a second input signal and generate a second frequency-mixing signal according to the second input signal and the local oscillator signal. The second input signal is input by the input unit according to the first input signal and the local oscillator signal. The calibration unit is further configured to obtain second direct current offset information of the radio frequency receiving link, and perform frequency calibration for the radio frequency receiving link according to the first direct current offset information and the second direct current offset information. The second direct current offset information is direct current offset information in the radio frequency receiving link when the receiving link frequency-mixing unit generates the second frequency-mixing signal.

According to another embodiment of the present disclosure, a frequency calibration method for a radio frequency receiving link is also provided. The frequency calibration method is applied to the radio frequency receiving link in the above embodiment, and includes the following operations.

First direct current offset information of the radio frequency receiving link is obtained. The first direct current offset information is direct current offset information in the radio frequency receiving link when a receiving link frequency-mixing unit generates a first frequency-mixing signal. The first frequency-mixing signal is a frequency-mixing signal obtained by the receiving link frequency-mixing unit according to a first input signal input by an input unit and a local oscillator signal generated by a clock unit.

Second direct current offset information of the radio frequency receiving link is obtained. The second direct current offset information is direct current offset information in the radio frequency receiving link when the receiving link frequency-mixing unit generates a second frequency-mixing signal. The second frequency-mixing signal is a frequency-mixing signal generated by the receiving link frequency-mixing unit according to a second input signal and the local oscillator signal. The second input signal is input by the input unit according to the first input signal and the local oscillator signal.

Frequency calibration is performed for the radio frequency receiving link according to the first direct current offset information and the second direct current offset information.

According to another embodiment of the present disclosure, a radio frequency transceiving device is also provided, which includes a radio frequency receiving link and a radio frequency transmitting link. The radio frequency receiving link includes: an input unit, a clock unit, a receiving link frequency-mixing unit, and a calibration unit.

The input unit is configured to input a first input signal. The clock unit is configured to generate a local oscillator signal. The receiving link frequency-mixing unit is configured to obtain the first input signal and the local oscillator signal, and generate a first frequency-mixing signal according to the first input signal and the local oscillator signal. The calibration unit is configured to obtain first direct current offset information of the radio frequency receiving link. The first direct current offset information is direct current offset information in the radio frequency receiving link when the receiving link frequency-mixing unit generates the first frequency-mixing signal.

The radio frequency transmitting link includes: a transmitting link frequency-mixing unit and an output unit.

The transmitting link frequency-mixing unit is configured to obtain a preset analog signal, the local oscillator signal and preset fourth direct current offset information, and generate a third frequency-mixing signal according to the analog signal, the local oscillator signal and the fourth direct current offset information.

The output unit is configured to obtain an output signal according to the third frequency-mixing signal, and send the output signal to the input unit in the radio frequency receiving link.

The receiving link frequency-mixing unit is further configured to obtain a third input signal and generate a fourth frequency-mixing signal according to the third input signal and the local oscillator signal. The third input signal is input by the input unit according to the first input signal and the output signal. The calibration unit is further configured to obtain fifth direct current offset information of the radio frequency receiving link, and perform frequency calibration for the radio frequency transmitting link according to the first direct current offset information and the fifth direct current offset information. The fifth direct current offset information is direct current offset information in the radio frequency receiving link when the receiving link frequency-mixing unit generates the fourth frequency-mixing signal.

According to another embodiment of the present disclosure, a frequency calibration method for a radio frequency transceiving device is also provided. The frequency calibration method is applied to the radio frequency transceiving device in the above embodiment, and includes the following operations.

First direct current offset information of a radio frequency receiving link is obtained. The first direct current offset information is direct current offset information in the radio frequency receiving link when a receiving link frequency-mixing unit generates a first frequency-mixing signal. The first frequency-mixing signal is a frequency-mixing signal obtained by the receiving link frequency-mixing unit according to a first input signal input by an input unit and a local oscillator signal generated by a clock unit.

Fifth direct current offset information of the radio frequency receiving link is obtained. The fifth direct current offset information is direct current offset information in the radio frequency receiving link when the receiving link frequency-mixing unit generates a fourth frequency-mixing signal. The fourth frequency-mixing signal is a frequency-mixing signal generated by the receiving link frequency-mixing unit according to the third input signal and the local oscillator signal. The third input signal is input by the input unit according to the first input signal and an output signal output by an output unit in a radio frequency transmitting link. The output signal is obtained by the input unit according to a third frequency-mixing signal generated by a transmitting link frequency-mixing unit. The third frequency-mixing signal is a frequency-mixing signal generated by the transmitting link frequency-mixing unit according to a preset analog signal, the local oscillator signal and preset fourth direct current offset information.

Frequency calibration is performed for the radio frequency transmitting link according to the first direct current offset information and the fifth direct current offset information.

According to another embodiment of the present disclosure, a frequency calibration device for a radio frequency receiving link is also provided. The frequency calibration device is arranged in the radio frequency receiving link in the above embodiment, and includes: a first obtaining module, a second obtaining module and a first calibration module.

The first obtaining module is configured to obtain first direct current offset information of the radio frequency receiving link. The first direct current offset information is direct current offset information in the radio frequency receiving link when a receiving link frequency-mixing unit generates a first frequency-mixing signal. The first frequency-mixing signal is a frequency-mixing signal obtained by the receiving link frequency-mixing unit according to a first input signal input by an input unit and a local oscillator signal generated by a clock unit.

The second obtaining module is configured to obtain second direct current offset information of the radio frequency receiving link. The second direct current offset information is direct current offset information in the radio frequency receiving link when the receiving link frequency-mixing unit generates a second frequency-mixing signal. The second frequency-mixing signal is a frequency-mixing signal generated by the receiving link frequency-mixing unit according to a second input signal and the local oscillator signal. The second input signal is input by the input unit according to the first input signal and the local oscillator signal.

The first calibration module is configured to perform frequency calibration for the radio frequency receiving link according to the first direct current offset information and the second direct current offset information.

According to another embodiment of the present disclosure, a frequency calibration device for a radio frequency transceiving device is also provided. The frequency calibration device is arranged in the radio frequency transceiving device in the above embodiment, and includes: a third obtaining module, a fourth obtaining module and a second calibration module.

The third obtaining module is configured to obtain first direct current offset information of a radio frequency receiving link. The first direct current offset information is direct current offset information in the radio frequency receiving link when a receiving link frequency-mixing unit generates a first frequency-mixing signal. The first frequency-mixing signal is a frequency-mixing signal obtained by the receiving link frequency-mixing unit according to a first input signal input by an input unit and a local oscillator signal generated by a clock unit.

The fourth obtaining module is configured to obtain fifth direct current offset information of the radio frequency receiving link. The fifth direct current offset information is direct current offset information in the radio frequency receiving link when the receiving link frequency-mixing unit generates a fourth frequency-mixing signal. The fourth frequency-mixing signal is a frequency-mixing signal generated by the receiving link frequency-mixing unit according to the third input signal and the local oscillator signal. The third input signal is input by the input unit according to the first input signal and an output signal output by an output unit in a radio frequency transmitting link. The output signal is obtained by the input unit according to a third frequency-mixing signal generated by a transmitting link frequency-mixing unit. The third frequency-mixing signal is a frequency-mixing signal generated by the transmitting link frequency-mixing unit according to a preset analog signal, the local oscillator signal and preset fourth direct current offset information.

The second calibration module is configured to perform frequency calibration for the radio frequency transmitting link according to the first direct current offset information and the fifth direct current offset information.

According to another embodiment of the present disclosure, a computer-readable storage medium is also provided, in which a computer program is stored. The computer program is configured to execute, when running, the operations in any above method embodiment.

According to another embodiment of the present disclosure, an electronic device is also provided, which includes a memory and a processor. The memory stores a computer program. The processor is configured to run the computer program to execute the operations in any above method embodiment.

By means of the embodiments of the present disclosure, the calibration unit in the radio frequency receiving link is configured to obtain the first direct current offset information and the second direct current offset information of the radio frequency receiving link, and perform frequency calibration for the radio frequency receiving link according to the first direct current offset information and the second direct current offset information. The first direct current offset information is direct current offset information in the radio frequency receiving link when the receiving link frequency-mixing unit generates the first frequency-mixing signal. The second direct current offset information is direct current offset information in the radio frequency receiving link when the receiving link frequency-mixing unit generates the second frequency-mixing signal. Therefore, the embodiments of the present disclosure can solve the problem in the related art that efficient frequency calibration cannot be implemented for a receiving link in a radio frequency transceiver, so as to achieve efficient frequency calibration for a radio frequency receiving link in a process of simulation and test of a radio frequency transceiver chip.

BRIEF DESCRIPTION OF THE DRAWINGS

The accompanying drawings described here are used for providing further understanding of the present disclosure, and constitute a part of the present disclosure. Schematic embodiments of the present disclosure and description thereof are used for illustrating the present disclosure and not intended to form an improper limit to the present disclosure. In the accompanying drawings:

FIG. 7 is a flowchart of a frequency calibration method for a radio frequency receiving link provided according to an embodiment of the present disclosure;

FIG. 8 is a first functional schematic diagram of a radio frequency transceiving device provided according to an embodiment of the present disclosure;

FIG. 11 is a flowchart of a frequency calibration method for a radio frequency transceiving device provided according to an embodiment of the present disclosure;

FIG. 12 is a structural block diagram of a frequency calibration device for a radio frequency receiving link provided according to an embodiment of the present disclosure; and FIG. 13 is a structural block diagram of a frequency calibration device for a radio frequency transceiving device provided according to an embodiment of the present disclosure.

DETAILED DESCRIPTION

The present disclosure is elaborated below with reference to the accompanying drawings and embodiments. It is to be noted that the embodiments in the present disclosure and characteristics in the embodiments may be combined without conflicts.

It should be noted that terms "first", "second", etc. in the specification describing the embodiments of the present disclosure, the claims, and the foregoing drawings are used for distinguishing similar objects rather than describing a specific sequence or a precedence order.

Figure 1:
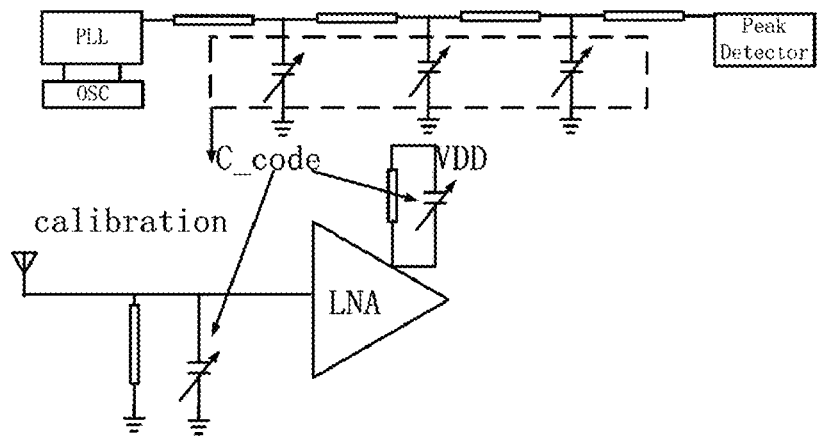
FIG. 1 is a circuit diagram of using a power detector to perform frequency calibration for a radio frequency transceiver provided according to the related art.
Figure 2:
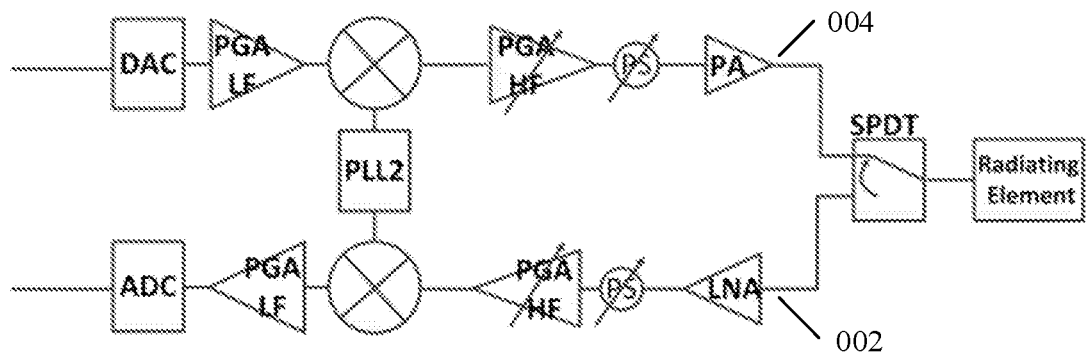
FIG. 2 is a circuit diagram of a radio frequency transceiving device provided according to the related art.

To further illustrate the operating principle of a radio frequency receiving link and a radio frequency transceiving device in the embodiments of the present disclosure, the composition of the radio frequency transceiving device is described in detail below. FIG. 2 is a circuit diagram of a radio frequency transceiving device provided according to the related art. As shown in FIG. 2, the radio frequency transceiving device is composed of a radio frequency receiving link 002 and a radio frequency transmitting link 004. As shown in FIG. 2, the radio frequency receiving link is composed of an LNA, a PS, a Programmable Gain Amplifier High Frequency (PGA HF), a mixer, a Programmable Gain Amplifier Low Frequency (PGA LF) and an Analog-to-Digital Converter (ADC). The radio frequency transmitting link is composed of a Digital-to-Analog Converter (DAC), a PGA LF, a mixer, a PGA HF, a PS and a Power Amplifier (PA). The radio frequency transceiving device further includes a clock circuit PLL, which is configured to provide a clock signal respectively to the mixers of the radio frequency receiving link and the radio frequency transmitting link as a local oscillator signal of the mixers. In the radio frequency transceiving device, the radio frequency receiving link is configured to receive an analog signal input by an external radiating element through a Single Pole Double Throw (SPDT) switch. The radio frequency transmitting link is configured to convert a preset digital signal into an analog signal, and then output the analog signal to the external radiating element through the SPDT switch.

Embodiment 1

Figure 3:
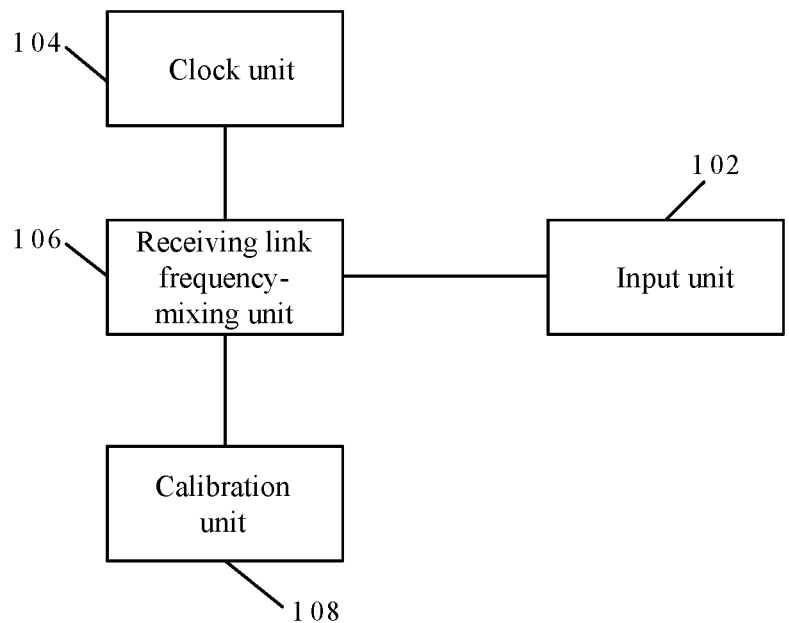
FIG. 3 is a first functional schematic diagram of a radio frequency receiving link provided according to an embodiment of the present disclosure.

The present embodiment provides a radio frequency receiving link. FIG. 3 is a first functional schematic diagram of a radio frequency receiving link provided according to an embodiment of the present disclosure. As shown in FIG. 3, the radio frequency receiving link in the present embodiment includes: an input unit 102, a clock unit 104, a receiving link frequency-mixing unit 106 and a calibration unit 108.

The input unit 102 is configured to input a first input signal.

The clock unit 104 is configured to generate a local oscillator signal.

The receiving link frequency-mixing unit 106 is configured to obtain the first input signal and the local oscillator signal, and generate a first frequency-mixing signal according to the first input signal and the local oscillator signal.

The calibration unit 108 is configured to obtain first direct current offset information of the radio frequency receiving link. The first direct current offset information is direct current offset information in the radio frequency receiving link when the receiving link frequency-mixing unit generates the first frequency-mixing signal.

The receiving link frequency-mixing unit 106 is further configured to obtain a second input signal and generate a second frequency-mixing signal according to the second input signal and the local oscillator signal. The second input signal is input by the input unit according to the first input signal and the local oscillator signal. The calibration unit 108 is further configured to obtain second direct current offset information of the radio frequency receiving link, and perform frequency calibration for the radio frequency receiving link according to the first direct current offset information and the second direct current offset information. The second direct current offset information is direct current offset information in the radio frequency receiving link when the receiving link frequency-mixing unit generates the second frequency-mixing signal.

It is to be further noted that the input unit in the present embodiment is configured to indicate a link input part in the radio frequency receiving link. The link input part is configured to receive the input signal of the radio frequency receiving link. The input unit may be composed of the input end of the whole radio frequency receiving link. The first input signal input by the input unit in the present embodiment indicates the input signal received by the radio frequency receiving link in an initial state, for example, the analog signal input by the external radiating element.

The clock unit in the present embodiment may be composed of a clock circuit. The receiving link frequency-mixing unit in the present embodiment may be composed of a mixer. The receiving link frequency-mixing unit is configured to obtain the first input signal and the local oscillator signal, that is, instruct the input unit to send the first input signal to the receiving link frequency-mixing unit, and instruct the clock unit to send the local oscillator signal to the receiving link frequency-mixing unit. The first input signal may be sent to the receiving link frequency-mixing unit directly or after being processed by corresponding devices. For example, the first input signal is input to the receiving link frequency-mixing unit after being processed by the LNA, the PS and the PGA HF. Those skilled in the art can know, according to the common general knowledge in the art, the corresponding processing and processing mode of the input signal required before mixing in the radio frequency receiving link, so elaborations are omitted herein.

In the present embodiment, the second input signal obtained by the receiving link frequency-mixing unit indicates the input signal input by the input unit according to the first input signal and the local oscillator signal, specifically the signal obtained by the receiving link frequency-mixing unit when the input unit inputs both the first input signal and the local oscillator signal.

It is to be further noted that the calibration unit in the present embodiment may be either a physical unit composed of hardware or a virtual unit composed of software, that is, all hardware or software units that can obtain the first direct current offset information and the second direct current offset information of the radio frequency receiving link, and perform frequency calibration for the radio frequency receiving link according to the first direct current offset information and the second direct current offset information in the present embodiment can serve as the calibration unit in the present embodiment. The present disclosure does not limit the specific form of the calibration unit. In the above embodiment, the first direct current offset information indicates direct current offset information in the radio frequency receiving link obtained by the calibration unit via detecting the radio frequency receiving link when the receiving link frequency-mixing unit generates the first frequency-mixing signal. Similarly, the second direct current offset information indicates direct current offset information in the radio frequency receiving link obtained by the calibration unit via detecting the radio frequency receiving link when the receiving link frequency-mixing unit generates the second frequency-mixing signal.

By means of the radio frequency receiving link in the present embodiment, the calibration unit in the radio frequency receiving link is configured to obtain the first direct current offset information and the second direct current offset information of the radio frequency receiving link, and perform frequency calibration for the radio frequency receiving link according to the first direct current offset information and the second direct current offset information. The first direct current offset information is direct current offset information in the radio frequency receiving link when the receiving link frequency-mixing unit generates the first frequency-mixing signal. The second direct current offset information is direct current offset information in the radio frequency receiving link when the receiving link frequency-mixing unit generates the second frequency-mixing signal. Therefore, the radio frequency receiving link in the present embodiment can solve the problem in the related art that efficient frequency calibration cannot be implemented for a receiving link in a radio frequency transceiver, so as to achieve efficient frequency calibration for a radio frequency receiving link in a process of simulation and test of a radio frequency transceiver chip.

In an exemplary embodiment, the calibration unit 108 is further configured to:
determine third direct current offset information according to a difference value between the first direct current offset information and the second direct current offset information, and perform frequency calibration for the radio frequency receiving link according to the third direct current offset information.

It is to be further noted that the third direct current offset information indicates an absolute value of the difference value between the first direct current offset information and the second direct current offset information.

In an exemplary embodiment, the radio frequency receiving link further includes:
an LNA 110, a PS 112 and a PGA HF 114.

The LNA 110, the PS 112 and the PGA HF 114 are respectively arranged between the input unit and the receiving link frequency-mixing unit.

Figure 4:
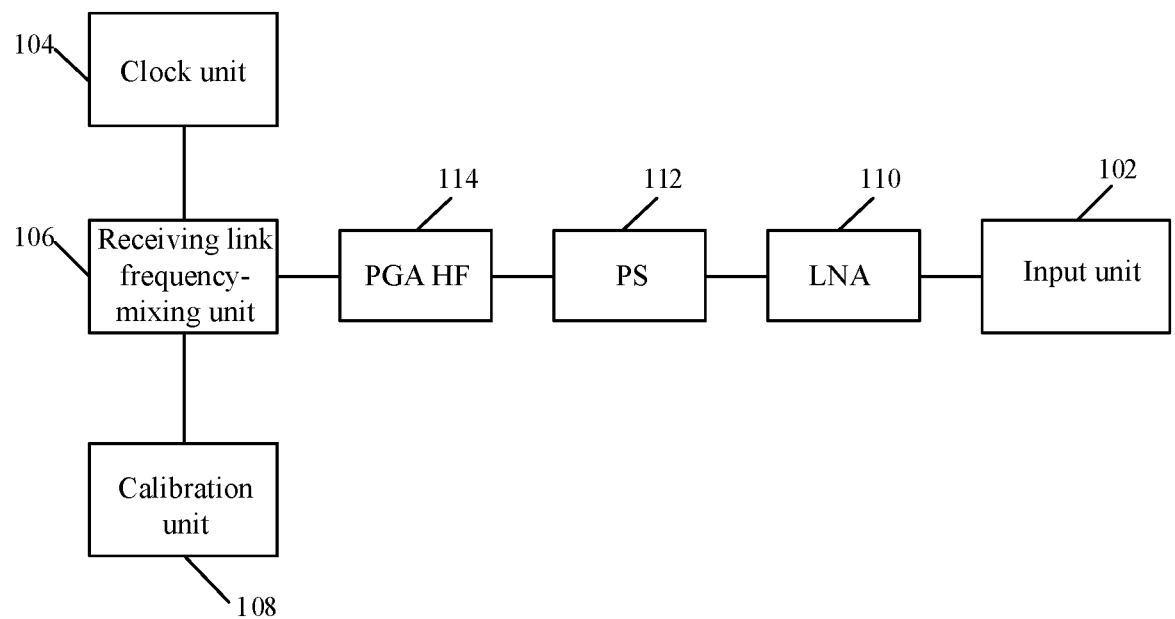
FIG. 4 is a second functional schematic diagram of a radio frequency receiving link provided according to an embodiment of the present disclosure.

It is to be further noted that, that the LNA, the PS and the PGA HF are respectively arranged between the input unit and the receiving link frequency-mixing unit indicates that the first input signal or the second input signal input by the input unit sequentially passes through the LNA, the PS and the PGA HF and is finally input to the receiving link frequency-mixing unit. FIG. 4 is a second functional schematic diagram of a radio frequency receiving link provided according to an embodiment of the present disclosure. The LNA, the PS and the PGA HF are arranged as shown in FIG. 4.

In an exemplary embodiment, the calibration unit 108 is further configured to:
adjust frequency response information of the LNA 110, the PS 112 and the PGA HF 114 according to the third direct current offset information, so as to perform frequency calibration for the radio frequency receiving link.

In an exemplary embodiment, the calibration unit 108 is further configured to:
adjust the frequency response information of the LNA 110, the PS 112 and the PGA HF 114 to maximize the third direct current offset information.

It is to be further noted that the frequency response information indicates a frequency response curve. Specifically, attributes, such as the capacitance, of the corresponding device can be adjusted to make the corresponding frequency response curve meet the requirements of the above exemplary embodiments.

In an exemplary embodiment, the calibration unit 108 is further configured to:
obtain the local oscillator signal, and send the local oscillator signal to the input unit 102 after performing amplitude limiting processing on the local oscillator signal, so that the input unit 102 inputs the second input signal according to the first input signal and the local oscillator signal.

It is to be further noted that the arrangement of a limiter in the above exemplary embodiments can effectively avoid the damage to the radio frequency receiving link caused by the excessive voltage amplitude of the local oscillator signal.

In an exemplary embodiment, the radio frequency receiving link further includes:
an analog-to-digital conversion unit, configured to obtain the first frequency-mixing signal or the second frequency-mixing signal, and output a corresponding digital signal according to the first frequency-mixing signal or the second frequency-mixing signal.

To further illustrate the radio frequency receiving link in the present embodiment, the composition and principle of the radio frequency receiving link in the present embodiment are described in detail below by means of exemplary embodiments.

Figure 5:
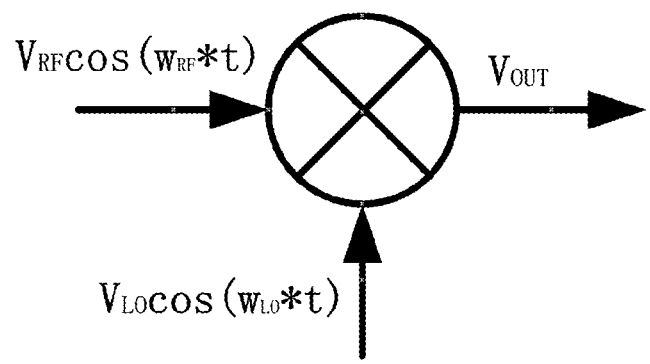
FIG. 5 is a diagram showing the principle of a mixer provided according to an exemplary embodiment of the present disclosure.

First, the operating principle of the mixer is further illustrated. FIG. 5 is a diagram showing the principle of a mixer provided according to an exemplary embodiment of the present disclosure. The operating principle of the mixer is shown in FIG. 5. The mixer in the radio frequency receiving link is equivalent to a multiplier in an analog circuit. If the input signal of the mixer is set as $V_{RF} \cos(w_{RF}t)$, the local oscillator signal is set as $V_{LO} \cos(w_{LO}t)$, and the gain of the mixer is set as $A_{MIXER}$, the output signal of the mixer satisfies the following formula:

$$V_{OUT}=A_{MIXER}*V_{RF}\cos(w_{RF}t)*V_{LO}\cos(w_{LO}t)$$
$$=\tfrac{1}{2}A_{MIXER}*V_{RF}V_{LO}[\cos(w_{RF}t+w_{LO}t)+\cos(w_{RF}t-w_{LO}t)].$$

Generally speaking, the output of the mixer will be filtered, that is, a low pass filter is set to filter out high frequency items in the output signal of the mixer, that is, the output signal of the mixer after filtering is:

$$V_{OUT}=\tfrac{1}{2}A_{MIXER}*V_{RF}*V_{LO}\cos(w_{RF}t-w_{LO}t).$$

If the input signal of the mixer here has the same frequency as the local oscillator signal, the output signal of the mixer is a direct current signal, and has amplitude of:

$$V_{OUT} = \frac{A_{MIXER} * V_{RF} V_{LO}}{2}.$$

Thus, it can be known that a frequency calibration method for the radio frequency receiving link as described in the following exemplary embodiment can be used.

Figure 6:
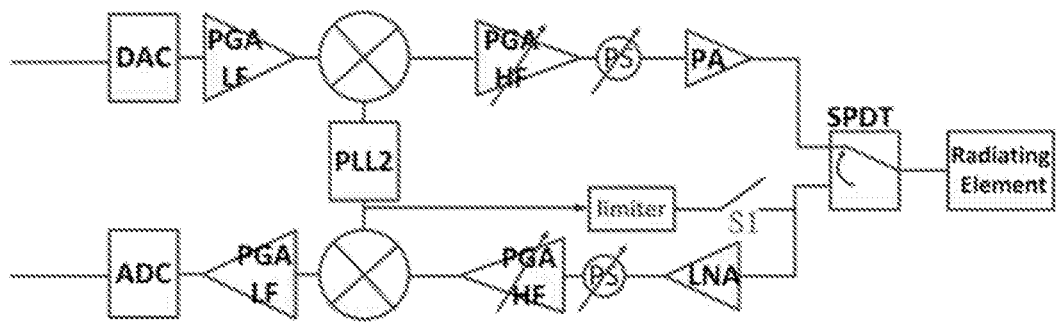
FIG. 6 is a circuit diagram of a radio frequency receiving link provided according to an exemplary embodiment of the present disclosure.

FIG. 6 is a circuit diagram of a radio frequency receiving link provided according to an exemplary embodiment of the present disclosure. As shown in FIG. 6, in the present exemplary embodiment, the radio frequency receiving link is composed of an LNA, a PS, a PGA HF, a receiving link mixer, a PGA LF and an ADC. The radio frequency receiving link is further provided with a clock circuit PLL to provide the local oscillator signal to the receiving link mixer. In the above radio frequency receiving link, an input end of the radio frequency receiving link forms the input unit in the present embodiment to input the first input signal input by the external radiating element at the initial time. The clock circuit forms the clock unit in the present embodiment to generate the local oscillator signal. The receiving link mixer forms the receiving link frequency-mixing unit in the present embodiment to generate the first frequency-mixing signal according to the first input signal and the local oscillator signal.

In the present exemplary embodiment, in order to realize frequency calibration for the radio frequency receiving link, the clock circuit is also connected to the input end of the radio frequency receiving link, and a switch S1 and a limiter are arranged in the connected link.

In a process of simulation and test of a radio frequency transceiver chip, the S1 is turned off, so that the signal input by the input end of the radio frequency receiving link includes only the first input signal input by the radiating element; the first input signal is processed successively by the LNA, the PS and the PGA HF, and then input to the receiving link mixer; and the receiving link mixer mixes the first input signal and the local oscillator signal provided by the clock circuit to generate the first frequency-mixing signal and sends the first frequency-mixing signal to the ADC for analog-to-digital conversion.

After the input end of the ADC receives the first frequency-mixing signal, a direct current offset of the radio frequency receiving link can be detected at the input end of the ADC to obtain the first direct current offset information. The first direct current offset information is composed of two parts, including a direct current offset of a post circuit of the mixer and a direct current offset of the ADC itself. Here, the first direct current offset information is expressed as $V_{dc}^{LF}$.

After the first direct current offset information is obtained, the switch S1 can be turned on, so that the clock circuit can inject the local oscillator signal to the input end of the radio frequency receiving link through the limiter, in this case, the input signals input by the input end include the original first input signal and the local oscillator signal. The first input signal and the local oscillator signal form the second input signal in the present embodiment. Here, the second input signal can be expressed as $V_{RF} \cos(w_{LO} t)$. The second input signal is processed successively by the LNA, the PS and the PGA HF according to structure of the link, and then input to the receiving link mixer. The receiving link mixer generates the second frequency-mixing signal according to the second input signal and the local oscillator signal, and sends the second frequency-mixing signal to the ADC for analog-to-digital conversion.

After the input end of the ADC receives the second frequency-mixing signal, a direct current offset of the radio frequency receiving link can be detected at the input end of the ADC again to obtain the second direct current offset information in the present embodiment. Here, the second direct current offset information is expressed as $V_{dc}^{TOT}$.

If the gain of the LNA in the radio frequency receiving link is set as $A_{LNA}$, the gain of the PS is set as $A_{PS}$, the gain of the PGA HF is set as $A_{PGA}^{HF}$, the gain of the receiving link mixer is set as $A_{MIXER}$, and the gain of the PGA LF is set as $A_{PGA}^{LF}$, the second direct current offset information $V_{dc}^{TOT}$ can be expressed by the following formula:

$$V_{dc}^{TOT} = V_{dc}^{LF} + A_{LNA} * A_{PS} * A_{PGA}^{HF} * A_{MIXER} * A_{PGA}^{LF} * \frac{V_{RF} V_{LO}}{2}.$$

The third direct current offset information $V_{dc}^{TOTa}$ can be obtained by subtracting the first direct current offset information from the second direct current offset information. The third direct current offset information $V_{dc}^{TOTa}$ can be expressed by the following formula:

$$V_{dc}^{TOTa} = V_{dc}^{LF} + A_{LNA} * A_{PS} * A_{PGA}^{HF} * A_{MIXER} * A_{PGA}^{LF} * \frac{V_{RF} V_{LO}}{2} - V_{dc}^{LF}$$

$$= A_{LNA} * A_{PS} * A_{PGA}^{HF} * A_{MIXER} * A_{PGA}^{LF} * \frac{V_{RF} V_{LO}}{2}.$$

In practical circuits, the gain $A_{LNA}$ of the LNA, the gain $A_{PS}$ of the PS and the gain $A_{PGA}^{HF}$ of the PGA HF are usually affected by manufacturing processes and package parasitic, and the maximum gain deviates from a frequency value required. In this case, by sequentially adjusting frequency control words corresponding to the LNA, the PS and the PGA HF to maximize the value of the third direct current offset information $V_{dc}^{TOTa}$, the gain $A_{LNA}$ of the LNA, the gain $A_{PS}$ of the PS and the gain $A_{PGA}^{HF}$ of the PGA HF can be ensured to be maximized at the local frequency, so as to realize frequency calibration for a receiving channel.

Embodiment 2

The present embodiment provides a frequency calibration method for a radio frequency receiving link, which is applied to the radio frequency receiving link in embodiment 1. FIG. 7 is a flowchart of a frequency calibration method for a radio frequency receiving link provided according to an embodiment of the present disclosure. As shown in FIG. 7, the frequency calibration method for a radio frequency receiving link in the present embodiment includes the following operations.

At S202, the first direct current offset information of the radio frequency receiving link is obtained. The first direct current offset information is direct current offset information in the radio frequency receiving link when the receiving link frequency-mixing unit generates the first frequency-mixing signal. The first frequency-mixing signal is a frequency-mixing signal obtained by the receiving link frequency-mixing unit according to the first input signal input by the input unit and the local oscillator signal generated by the clock unit.

At S204, the second direct current offset information of the radio frequency receiving link is obtained. The second direct current offset information is direct current offset information in the radio frequency receiving link when the receiving link frequency-mixing unit generates the second frequency-mixing signal. The second frequency-mixing signal is a frequency-mixing signal generated by the receiving link frequency-mixing unit according to the second input signal and the local oscillator signal. The second input signal is input by the input unit according to the first input signal and the local oscillator signal.

At S206, frequency calibration is performed for the radio frequency receiving link according to the first direct current offset information and the second direct current offset information.

It is to be further noted that the execution entity of S202 to S206 in the embodiment may be a calibration unit, and the calibration unit may be either a physical unit composed of hardware or a virtual unit composed of software, that is, all hardware or software units that can obtain the first direct current offset information and the second direct current offset information of the radio frequency receiving link, and perform frequency calibration for the radio frequency receiving link according to the first direct current offset information and the second direct current offset information in the present embodiment can serve as the calibration unit in the present embodiment. The present disclosure does not limit the specific form of the calibration unit.

It is to be further noted that the input unit in S202 is configured to indicate the link input part in the radio frequency receiving link. The link input part is configured to receive the input signal of the radio frequency receiving link. The input unit may be composed of the input end of the whole radio frequency receiving link. The first input signal input by the input unit in S202 indicates the input signal received by the radio frequency receiving link in an initial state, for example, the analog signal input by the external radiating element.

The clock unit in S202 may be composed of a clock circuit. The receiving link frequency-mixing unit in S202 may be composed of a mixer. The receiving link frequency-mixing unit is configured to obtain the first input signal and the local oscillator signal, that is, instruct the input unit to send the first input signal to the receiving link frequency-mixing unit, and instruct the clock unit to send the local oscillator signal to the receiving link frequency-mixing unit. The first input signal may be sent to the receiving link frequency-mixing unit directly or after being processed by corresponding devices. For example, the first input signal is input to the receiving link frequency-mixing unit after being processed by the LNA, the PS and the PGA HF. Those skilled in the art can know, according to the common general knowledge in the art, the corresponding processing and processing mode of the input signal required before mixing in the radio frequency receiving link, so elaborations are omitted herein.

In S204, that the second input is input by the input unit according to the first input signal and the local oscillator signal indicates that the second input signal is an input signal input by the input unit according to the first input signal and the local oscillator signal, specifically the signal obtained by the receiving link frequency-mixing unit when the input unit inputs both the first input signal and the local oscillator signal.

It is to be further noted that, in S202, the first direct current offset information indicates direct current offset information in the radio frequency receiving link obtained by detecting the radio frequency receiving link when the receiving link frequency-mixing unit generates the first frequency-mixing signal. In S204, the second direct current offset information indicates direct current offset information in the radio frequency receiving link obtained by the calibration unit via detecting the radio frequency receiving link when the receiving link frequency-mixing unit generates the second frequency-mixing signal.

By means of the frequency calibration method for a radio frequency receiving link in the present embodiment, the first direct current offset information and the second direct current offset information of the radio frequency receiving link can be obtained, and frequency calibration is performed for the radio frequency receiving link according to the first direct current offset information and the second direct current offset information. The first direct current offset information is direct current offset information in the radio frequency receiving link when the receiving link frequency-mixing unit generates the first frequency-mixing signal. The second direct current offset information is direct current offset information in the radio frequency receiving link when the receiving link frequency-mixing unit generates the second frequency-mixing signal. Therefore, the frequency calibration method for a radio frequency receiving link in the present embodiment can solve the problem in the related art that efficient frequency calibration cannot be implemented for a receiving link in a radio frequency transceiver, so as to achieve efficient frequency calibration for the radio frequency receiving link in the process of simulation and test of a radio frequency transceiver chip.

In an exemplary embodiment, that frequency calibration is performed for the radio frequency receiving link according to the first direct current offset information and the second direct current offset information in S206 includes that:
  the third direct current offset information is determined according to the difference value between the first direct current offset information and the second direct current offset information; and
  frequency calibration is performed for the radio frequency receiving link according to the third direct current offset information.

It is to be further noted that the third direct current offset information indicates an absolute value of the difference value between the first direct current offset information and the second direct current offset information.

In an exemplary embodiment, that frequency calibration is performed for the radio frequency receiving link according to the first direct current offset information and the second direct current offset information in S206 further includes that:
  the frequency response information of the LNA, the PS, and the PGA HF in the radio frequency receiving link is adjusted according to the third direct current offset information, so as to perform frequency calibration for the radio frequency receiving link.

It is to be further noted that, that the LNA, the PS and the PGA HF are respectively arranged between the input unit and the receiving link frequency-mixing unit indicates that the first input signal or the second input signal input by the input unit sequentially passes through the LNA, the PS and the PGA HF and is finally input to the receiving link frequency-mixing unit.

In an exemplary embodiment, that the frequency response information of the LNA, the PS, and the PGA HF in the radio frequency receiving link is adjusted according to the third direct current offset information in S206 includes that:
  the frequency response information of the LNA, the PS and the PGA HF is adjusted to maximize the third direct current offset information.

In an exemplary embodiment, before the second direct current offset information is obtained in S204, the frequency calibration method further includes that:
  the local oscillator signal is sent to the input unit after performing amplitude limiting processing on the local oscillator signal, so that the input unit inputs the second input signal according to the first input signal and the local oscillator signal.

It is to be further noted that the arrangement of a limiter in the above exemplary embodiments can effectively avoid the damage to the radio frequency receiving link caused by the excessive voltage amplitude of the local oscillator signal.

Through the above description of implementations, those skilled in the art can clearly know that the frequency calibration method according to the above embodiments may be implemented by means of software plus a necessary common hardware platform, or by means of hardware; but in many cases, the former is the better implementation. Based on this understanding, the substance of the technical solution of the embodiments of the present disclosure or the part making a contribution to the conventional art can be embodied in the form of software product. The computer software product may be stored in a storage medium (for example, a Read-Only Memory (ROM)/Random Access Memory (RAM), a magnetic disk, and a compact disc) and may include a number of instructions to make a computer device (which can be a personal computer, a server or a network device, etc.) perform all or part of the frequency calibration method in each embodiment of the present disclosure.

Embodiment 3

The present embodiment provides a radio frequency transceiving device. FIG. 8 is a first functional schematic diagram of a radio frequency transceiving device provided according to an embodiment of the present disclosure. As shown in FIG. 8, the radio frequency transceiving device in the present embodiment includes a radio frequency receiving link and a radio frequency transmitting link. The radio frequency receiving link includes: an input unit 302, configured to input a first input signal; a clock unit 304, configured to generate a local oscillator signal; a receiving link frequency-mixing unit 306, configured to obtain the first input signal and the local oscillator signal, and generate a first frequency-mixing signal according to the first input signal and the local oscillator signal; and a calibration unit 308, configured to obtain first direct current offset information of the radio frequency receiving link. The first direct current offset information is direct current offset information in the radio frequency receiving link when the receiving link frequency-mixing unit 306 generates the first frequency-mixing signal.

The radio frequency transmitting link includes: a transmitting link frequency-mixing unit 310 and an output unit 312.

The transmitting link frequency-mixing unit 310 is configured to obtain a preset analog signal, the local oscillator signal and preset fourth direct current offset information, and generate a third frequency-mixing signal according to the analog signal, the local oscillator signal and the fourth direct current offset information.

The output unit 312 is configured to obtain an output signal according to the third frequency-mixing signal, and send the output signal to the input unit in the radio frequency receiving link.

The receiving link frequency-mixing unit 306 is further configured to obtain a third input signal and generate a fourth frequency-mixing signal according to the third input signal and the local oscillator signal. The third input signal is input by the input unit according to the first input signal and the output signal. The calibration unit 308 is further configured to obtain fifth direct current offset information of the radio frequency receiving link, and perform frequency calibration for the radio frequency transmitting link according to the first direct current offset information and the fifth direct current offset information. The fifth direct current offset information is direct current offset information in the radio frequency receiving link when the receiving link frequency-mixing unit generates the fourth frequency-mixing signal.

It is to be further noted that the input unit in the radio frequency receiving link in the present embodiment is configured to indicate the link input part in the radio frequency receiving link. The link input part is configured to receive the input signal of the radio frequency receiving link. The input unit may be composed of the input end of the whole radio frequency receiving link. The first input signal input by the input unit in the present embodiment may indicate the input signal received by the radio frequency receiving link in an initial state, for example, the analog signal input by the external radiating element.

The clock unit in the present embodiment may be composed of a clock circuit. The receiving link frequency-mixing unit in the present embodiment may be composed of a mixer arranged in the radio frequency receiving link. The receiving link frequency-mixing unit is configured to obtain the first input signal and the local oscillator signal, that is, instruct the input unit to send the first input signal to the receiving link frequency-mixing unit, and instruct the clock unit to send the local oscillator signal to the receiving link frequency-mixing unit. The first input signal may be sent to the receiving link frequency-mixing unit directly or after being processed by corresponding devices. For example, the first input signal is input to the receiving link frequency-mixing unit after being processed by the LNA, the PS and the PGA HF. Those skilled in the art can know, according to the common general knowledge in the art, the corresponding processing and processing mode of the input signal required before mixing in the radio frequency receiving link, so elaborations are omitted herein.

It is to be further noted that, in the radio frequency transmitting link, the transmitting link frequency-mixing unit may be composed of a mixer set in the radio frequency transmitting link. For the preset analog signal, the local oscillator signal and the preset fourth direct current offset information received by the transmitting link frequency-mixing unit, the preset analog signal indicates an analog signal to be sent through the radio frequency transmitting link, the local oscillator signal indicates a local oscillator signal provided by the clock unit, and the preset fourth direct current offset information is direct current offset information manually input in a process of simulation and test of the radio frequency transceiving device. Those skilled in the art can select the corresponding direct current offset information to be input into the transmitting link frequency-mixing unit according to the simulation or test requirements, and elaborations are omitted herein.

In the above radio frequency transmitting link, the output unit may be composed of an output end of the radio frequency transmitting link. On the one hand, the output end of the radio frequency transmitting link can transmit the analog signal in the radio frequency transmitting link to the external radiating element; on the other hand, in the present embodiment, the output end is configured to obtain an output signal according to the third frequency-mixing signal and send the output signal to the input unit in the radio frequency receiving link; specifically, the output unit receives the third frequency-mixing signal output by a transmitting link mixer. The third frequency-mixing signal can be processed by the corresponding devices and then sent to the output unit, for example, processed by the LNA, the PSPGA HF and then output to the output unit. Those skilled in the art can know, according to the common general knowledge in the art, the corresponding processing and processing mode of the frequency-mixing signal required before the frequency-mixing signal is output in the radio frequency transmitting link, so elaborations are omitted herein.

After receiving the third frequency-mixing signal output by the transmitting link mixer and processed correspondingly, the output unit can obtain the corresponding output signal and inject the output signal into the input unit of the radio frequency receiving link for frequency calibration of the radio frequency transmitting link. For the input unit of the radio frequency receiving link, the output signal of the radio frequency transmitting link and the first input signal input by the external radiating element are mixed and input to the radio frequency receiving link to obtain the input signal, namely the third input signal in the present embodiment.

In the radio frequency receiving link, when the input unit inputs the third input signal, the receiving link mixer can further obtain a fifth frequency-mixing signal according to the third input signal and the local oscillator signal.

It is to be further noted that the calibration unit in the present embodiment may be either the physical unit composed of hardware or the virtual unit composed of software, that is, all hardware or software units that can obtain the first direct current offset information and the fifth direct current offset information of the radio frequency receiving link, and perform frequency calibration for the radio frequency transmitting link according to the first direct current offset information and the fifth direct current offset information in the present embodiment can serve as the calibration unit in the present embodiment. The present disclosure does not limit the specific form of the calibration unit. In the above embodiment, the first direct current offset information indicates direct current offset information in the radio frequency receiving link obtained by the calibration unit via detecting the radio frequency receiving link when the receiving link frequency-mixing unit generates the first frequency-mixing signal. Similarly, the fifth direct current offset information indicates direct current offset information in the radio frequency receiving link obtained by the calibration unit via detecting the radio frequency receiving link when the receiving link frequency-mixing unit generates the fourth frequency-mixing signal.

It is to be further noted that, in the present embodiment, the corresponding direct current offset information in the radio frequency receiving link after the receiving link frequency-mixing unit in the radio frequency receiving link generates the corresponding frequency-mixing signal under different input signals is still used in the process of performing frequency calibration for the radio frequency transmitting link.

By means of the radio frequency transceiving device in the present embodiment, the calibration unit in the radio frequency receiving link is configured to obtain the first direct current offset information and the fifth direct current offset information of the radio frequency receiving link, and perform frequency calibration for the radio frequency receiving link according to the first direct current offset information and the fifth direct current offset information. The first direct current offset information is direct current offset information in the radio frequency receiving link when the receiving link frequency-mixing unit generates the first frequency-mixing signal. The fifth direct current offset information is direct current offset information in the radio frequency receiving link when the receiving link frequency-mixing unit generates the fourth frequency-mixing signal. Therefore, the radio frequency transceiving device in the present embodiment can solve the problem in the related art that efficient frequency calibration cannot be implemented for a transmitting link in a radio frequency transceiver, so as to achieve efficient frequency calibration for the radio frequency transmitting link in the process of simulation and test of a radio frequency transceiver chip.

In an exemplary embodiment, the calibration unit 308 is further configured to:

determine sixth direct current offset information according to a difference value between the first direct current offset information and the fifth direct current offset information, and perform frequency calibration for the radio frequency receiving link according to the sixth direct current offset information.

It is to be further noted that the sixth direct current offset information is an absolute value of the difference value between the first direct current offset information and the fifth direct current offset information.

In an exemplary embodiment, the radio frequency transmitting link further includes:

a PGA HF 314, a PS 316 and a PA 318.

The PGA HF, the PS and the PA are respectively arranged between the transmitting link frequency-mixing unit and the output unit.

Figure 9:
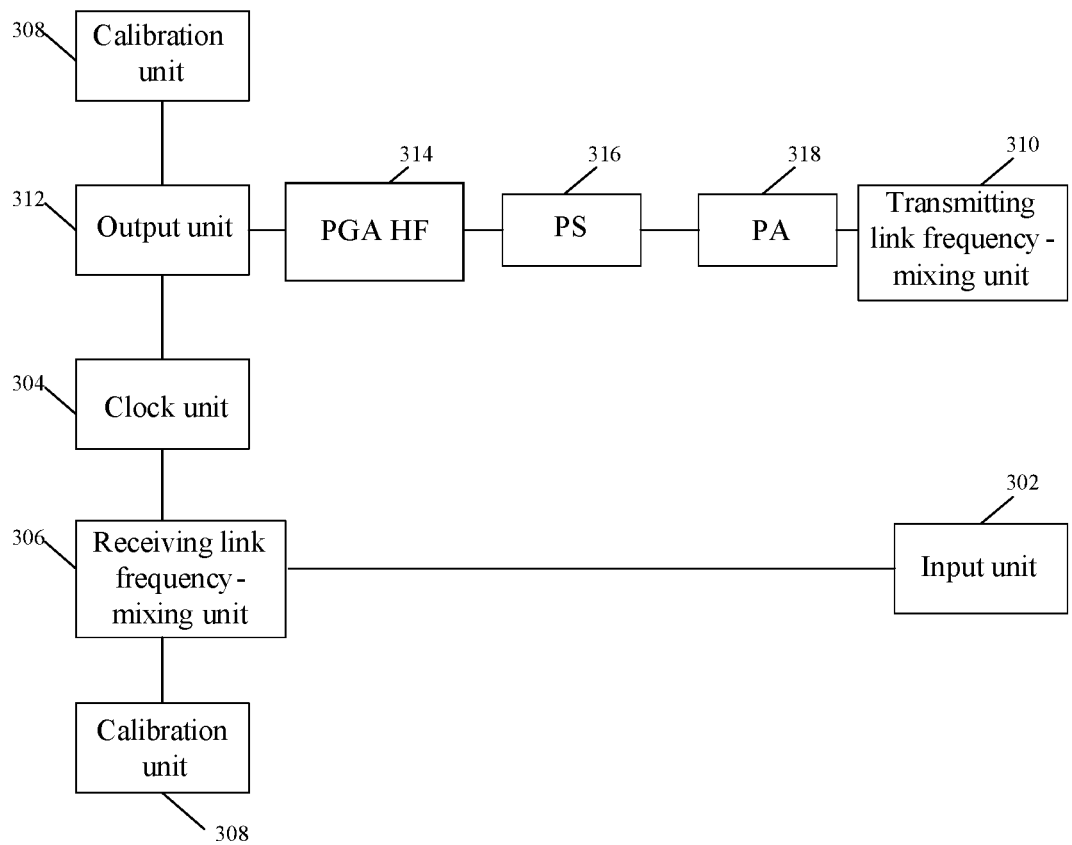
FIG. 9 is a second functional schematic diagram of a radio frequency transceiving device provided according to an embodiment of the present disclosure.

It is to be further noted that FIG. 9 is a second functional schematic diagram of a radio frequency transceiving device provided according to an embodiment of the present disclosure. The arrangement of the PGA HF, the PS and the PA in the radio frequency transmitting link is shown in FIG. 9. As shown in FIG. 9, the frequency-mixing signal generated by the transmitting link mixer, for example, the third frequency-mixing signal, can be processed by the PGA HF, the PS and the PA before entering the output unit to generate the output signal.

In an exemplary embodiment, the calibration unit 308 is further configured to:

adjust frequency response information of the PGA HF, the PS and the PA according to the sixth direct current offset information, so as to perform frequency calibration for the radio frequency transmitting link.

In an exemplary embodiment, the calibration unit is further configured to:

adjust the frequency response information of the LNA, the PS and the PGA HF to maximize the sixth direct current offset information.

In an exemplary embodiment, the calibration unit 308 is further configured to:

obtain the output signal, and send the output signal to the input unit after performing attenuation processing on the output signal, so that the input unit inputs the third input signal according to the first input signal and the output signal.

It is to be further noted that the arrangement of an attenuator in the above exemplary embodiment can effectively avoid the damage to the radio frequency receiving link caused by the excessive voltage of the output signal.

In an exemplary embodiment, the radio frequency transmitting link further includes:

a digital-to-analog conversion unit, configured to provide the preset analog signal to the transmitting link frequency-mixing unit.

To further illustrate the radio frequency transceiving device in the present embodiment, the composition and principle of the radio frequency transceiving device in the present embodiment are described in detail below by means of exemplary embodiments.

Figure 10:
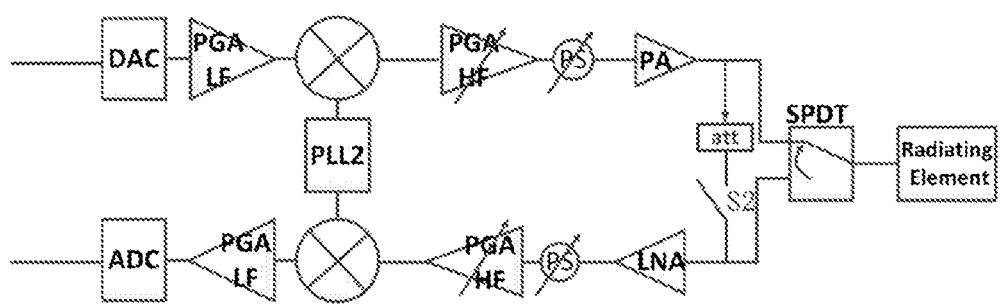
FIG. 10 is a circuit diagram of a radio frequency transceiving device provided according to an exemplary embodiment of the present disclosure.

FIG. 10 is a circuit diagram of a radio frequency transceiving device provided according to an exemplary embodiment of the present disclosure. As shown in FIG. 10, the radio frequency receiving link includes two parts, namely a radio frequency receiving link and a radio frequency transmitting link. The radio frequency receiving link is composed of an LNA, a PS, a PGA HF, a receiving link mixer, a PGA LF and an ADC. The radio frequency transmitting link is composed of an ADC, a PGA LF, a transmitting link mixer, a PGA HF, a PS and a PA. Moreover, a clock circuit PLL is also arranged in the radio frequency transceiving device to provide the local oscillator signal to the receiving link mixer and the transmitting link mixer.

In the above radio frequency receiving link, the input end of the radio frequency receiving link forms the input unit in the present embodiment to input the first input signal input by the external radiating element at the initial time. The clock circuit forms the clock unit in the present embodiment to generate the local oscillator signal. The receiving link mixer forms the receiving link frequency-mixing unit in the present embodiment to generate the first frequency-mixing signal according to the first input signal and the local oscillator signal.

In the above radio frequency transmitting link, the transmitting link mixer of the radio frequency transmitting link forms the transmitting link frequency-mixing unit in the present embodiment, and the output end of the radio frequency transmitting link forms the output unit in the present embodiment.

In the present exemplary embodiment, in order to realize frequency calibration for the radio frequency transmitting link, the output end of the radio frequency transmitting link is also connected to the input end of the radio frequency receiving link, and a switch S2 and an attenuator ATT are arranged in the connected link.

In the process of simulation and test of a radio frequency transceiver chip, the S2 is turned off, so that the signal input by the input end of the radio frequency receiving link includes only the first input signal input by the radiating element; the first input signal is processed successively by the LNA, the PS and the PGA HF, and then input to the receiving link mixer; and the receiving link mixer mixes the first input signal and the local oscillator signal provided by the clock circuit to generate the first frequency-mixing signal and sends the first frequency-mixing signal to the ADC for analog-to-digital conversion.

After the input end of the ADC receives the first frequency-mixing signal, a direct current offset of the radio frequency receiving link can be detected at the input end of the ADC to obtain the first direct current offset information. The first direct current offset information is composed of two parts, including the direct current offset of the post circuit of the mixer and the direct current offset of the ADC itself. Here, the first direct current offset information is expressed as $V_{dc}^{LF}$.

After the first direct current offset information is obtained, the operation on the radio frequency transmission link is performed. The preset fourth direct current offset information is added at the input end of the transmitting link mixer of the radio frequency transmitting link, then the transmitting link mixer can generate the third frequency-mixing signal in the above embodiment according to the preset analog signal sent by the ADC, the local oscillator signal sent by the clock circuit PLL and the fourth direct current offset information. The third mixing signal indicates a frequency-mixing signal obtained when the transmitting link mixer leaks the normally received local oscillator signal to the output end of the transmitting link mixer. The third frequency-mixing signal can be output to the output end of the radio frequency transmitting link through the PGA HF, the PS and the PA to generate the corresponding output signal.

In order to achieve frequency calibration of the radio frequency transmitting link, the switch S2 is turned on, so that the output signal of the output end of the radio frequency transmitting link is injected into the input end of the radio frequency receiving link through the attenuator. In this case, the input signals input by the input end of the radio frequency receiving link include the original first input signal and the output signal of the radio frequency transmitting link. The first input signal and the output signal form the third input signal in the present embodiment. Here, the third input signal can be expressed as $V_{RF}\cos(w_{LO}t)$. The third input signal is processed successively by the LNA, the PS and the PGA HF according to the radio frequency receiving link, and then input to the receiving link mixer. The receiving link mixer generates the fourth frequency-mixing signal according to the third input signal and the local oscillator signal, and sends the fourth frequency-mixing signal to the ADC for analog-to-digital conversion.

After the input end of the ADC receives the fourth frequency-mixing signal, a direct current offset of the radio frequency receiving link can be detected at the input end of the ADC again to obtain the fifth direct current offset information in the present embodiment. Here, the fifth direct current offset information is expressed as $V_{dc}^{TOT}$.

If the gain of the PGA HF in the radio frequency transmitting link is set as $A_{PGA}^{HFTX}$, the gain of the PS is set as $A_{PS}^{TX}$, the gain of the PA is set as $A_{PA}^{TX}$, the gain of the receiving link mixer is set as $A_{MIXER}$ and the gain of the PGA LF is set as $A_{PGA}^{LF}$, the fifth direct current offset information $V_{dc}^{TOT}$ can be expressed by the following formula:

$$V_{dc}^{TOT} = V_{dc}^{LF} + A_{PS}^{TX} * A_{PA}^{TX} * A_{PGA}^{HFTX} * A_{MIXER} * A_{PGA}^{LF} * \frac{V_{RF}V_{LO}}{2}.$$

The sixth direct current offset information $V_{dc}^{TOTa}$ can be obtained by subtracting the first direct current offset information from the fifth direct current offset information. The sixth direct current offset information $V_{dc}^{TOTa}$ can be expressed by the following formula:

$$V_{dc}^{TOTa} = V_{dc}^{LF} + A_{PS}^{TX} * A_{PA}^{TX} * A_{PGA}^{HFTX} * A_{MIXER} * A_{PGA}^{LF} * \frac{V_{RF}V_{LO}}{2} - V_{dc}^{LF}$$

$$= A_{PS}^{TX} * A_{PA}^{TX} * A_{PGA}^{HFTX} * A_{MIXER} * A_{PGA}^{LF} * \frac{V_{RF}V_{LO}}{2}.$$

In practical circuits, the gain $A_{PGA}^{HFTX}$ f the PGA HF, the gain $A_{PS}^{TX}$ of the PS and the gain $A_{PA}^{TX}$ of the PA are usually affected by manufacturing processes and package parasitic, and the maximum gain deviates from the frequency value required. In this case, by sequentially adjusting the frequency control words corresponding to the PGA HF, the PS and the PA to maximize the value of the sixth direct current offset information $V_{dc}^{TOTa}$, the corresponding gains of the PGA HF, the PS and the PA can be ensured to be maximized at the local frequency, so as to realize the frequency calibration of a transmitting channel.

Embodiment 4

The present embodiment provides a frequency calibration method for a radio frequency transceiving device, which is applied to the radio frequency transceiving device in embodiment 3. FIG. 11 is a flowchart of a frequency calibration method for a radio frequency transceiving device provided according to an embodiment of the present disclosure. As shown in FIG. 11, the frequency calibration method for a radio frequency transceiving device in the present embodiment includes the following operations.

At S402, the first direct current offset information of the radio frequency receiving link is obtained. The first direct current offset information is direct current offset information in the radio frequency receiving link when the receiving link frequency-mixing unit generates the first frequency-mixing signal. The first frequency-mixing signal is a frequency-mixing signal obtained by the receiving link frequency-mixing unit according to the first input signal input by the input unit and the local oscillator signal generated by the clock unit.

At S404, the fifth direct current offset information of the radio frequency receiving link is obtained. The fifth direct current offset information is direct current offset information in the radio frequency receiving link when the receiving link frequency-mixing unit generates the fourth frequency-mixing signal. The fourth frequency-mixing signal is a frequency-mixing signal generated by the receiving link frequency-mixing unit according to the third input signal and the local oscillator signal. The third input signal is input by the input unit according to the first input signal and the output signal output by the output unit in the radio frequency transmitting link. The output signal is obtained by the input unit according to the third frequency-mixing signal generated by the transmitting link frequency-mixing unit. The third frequency-mixing signal is the frequency-mixing signal generated by the transmitting link frequency-mixing unit according to the preset analog signal, the local oscillator signal and the preset fourth direct current offset information.

At S406, frequency calibration is performed for the radio frequency transmitting link according to the first direct current offset information and the fifth direct current offset information.

It is to be further noted that, in the present embodiment, the input unit in S402 is configured to indicate the link input part in the radio frequency receiving link. The link input part is configured to receive the input signal of the radio frequency receiving link. The input unit may be composed of the input end of the whole radio frequency receiving link. The first input signal input by the input unit in the present embodiment may indicate the input signal received by the radio frequency receiving link in an initial state, for example, the analog signal input by the external radiating element.

The clock unit in the present embodiment may be composed of a clock circuit. The receiving link frequency-mixing unit in the present embodiment may be composed of a mixer arranged in the radio frequency receiving link. The receiving link frequency-mixing unit is configured to obtain the first input signal and the local oscillator signal, that is, instruct the input unit to send the first input signal to the receiving link frequency-mixing unit, and instruct the clock unit to send the local oscillator signal to the receiving link frequency-mixing unit. The first input signal may be sent to the receiving link frequency-mixing unit directly or after being processed by corresponding devices. For example, the first input signal is input to the receiving link frequency-mixing unit after being processed by the LNA, the PS and the PGA HF. Those skilled in the art can know, according to the common general knowledge in the art, the corresponding processing and processing mode of the input signal required before mixing in the radio frequency receiving link, so elaborations are omitted herein.

It is to be further noted that, in the S404, the transmitting link frequency-mixing unit may be composed of a mixer set in the radio frequency transmitting link. For the preset analog signal, the local oscillator signal and the preset fourth direct current offset information received by the transmitting link frequency-mixing unit, the preset analog signal indicates an analog signal to be sent through the radio frequency transmitting link, the local oscillator signal indicates a local oscillator signal provided by the clock unit, and the preset fourth direct current offset information is direct current offset information manually input in a process of simulation and test of the radio frequency transceiving device. Those skilled in the art can select the corresponding direct current offset information to be input into the transmitting link frequency-mixing unit according to the simulation or test requirements, and elaborations are omitted herein.

In S404, the output unit may be composed of an output end of the radio frequency transmitting link. On the one hand, the output end of the radio frequency transmitting link can transmit the analog signal in the radio frequency transmitting link to the external radiating element; on the other hand, in the present embodiment, the output end is configured to obtain an output signal according to the third frequency-mixing signal and send the output signal to the input unit in the radio frequency receiving link; specifically, the output unit receives the third frequency-mixing signal output by the transmitting link mixer. The third frequency-mixing signal can be processed by the corresponding devices and then sent to the output unit, for example, processed by the LNA, the PSPGA HF and then output to the output unit. Those skilled in the art can know, according to the common general knowledge in the art, the corresponding processing and processing mode of the frequency-mixing signal required before the frequency-mixing signal is output in the radio frequency transmitting link, so elaborations are omitted herein.

After receiving the third frequency-mixing signal output by the transmitting link mixer and processed correspondingly, the output unit can obtain the corresponding output signal and inject the output signal into the input unit of the radio frequency receiving link for frequency calibration of the radio frequency transmitting link. For the input unit of the radio frequency receiving link, the output signal of the radio frequency transmitting link and the first input signal input by the external radiating element are mixed and input to the radio frequency receiving link to obtain the input signal, namely the third input signal in the present embodiment.

In the radio frequency receiving link, when the input unit inputs the third input signal, the receiving link mixer can further obtain the fifth frequency-mixing signal according to the third input signal and the local oscillator signal.

It is to be further noted that the calibration unit in the present embodiment may be either a physical unit composed of hardware or a virtual unit composed of software, that is, all hardware or software units that can obtain the first direct current offset information and the fifth direct current offset information of the radio frequency receiving link, and perform frequency calibration for the radio frequency transmitting link according to the first direct current offset information and the fifth direct current offset information in the present embodiment can serve as the calibration unit in the present embodiment. The present disclosure does not limit the specific form of the calibration unit. In the above embodiment, the first direct current offset information indicates direct current offset information in the radio frequency receiving link obtained by the calibration unit via detecting the radio frequency receiving link when the receiving link frequency-mixing unit generates the first frequency-mixing signal. Similarly, the fifth direct current offset information indicates direct current offset information in the radio frequency receiving link obtained by the calibration unit via detecting the radio frequency receiving link when the receiving link frequency-mixing unit generates the fourth frequency-mixing signal.

It is to be further noted that, in the present embodiment, the corresponding direct current offset information in the radio frequency receiving link after the receiving link frequency-mixing unit in the radio frequency receiving link generates the corresponding frequency-mixing signal under different input signals is still used in the process of performing frequency calibration for the radio frequency transmitting link.

By means of the frequency calibration method for the radio frequency transceiving device in the present embodiment, the calibration unit in the radio frequency receiving link is configured to obtain the first direct current offset information and the fifth direct current offset information of the radio frequency receiving link, and perform frequency calibration for the radio frequency receiving link according to the first direct current offset information and the fifth direct current offset information. The first direct current offset information is direct current offset information in the radio frequency receiving link when the receiving link frequency-mixing unit generates the first frequency-mixing signal. The fifth direct current offset information is direct current offset information in the radio frequency receiving link when the receiving link frequency-mixing unit generates the fourth frequency-mixing signal. Therefore, the frequency calibration method for a radio frequency transceiving device in the present embodiment can solve the problem in the related art that efficient frequency calibration cannot be implemented for a transmitting link in a radio frequency transceiver, so as to achieve efficient frequency calibration for the radio frequency transmitting link in the process of simulation and test of a radio frequency transceiver chip.

In an exemplary embodiment, that frequency calibration is performed for the radio frequency transmitting link according to the first direct current offset information and the fifth direct current offset information in S406 includes that:
the sixth direct current offset information is determined according to the difference value between the first direct current offset information and the fifth direct current offset information, and frequency calibration is performed for the radio frequency transmitting link according to the sixth direct current offset information.

It is to be further noted that the sixth direct current offset information is an absolute value of the difference value between the first direct current offset information and the fifth direct current offset information.

In an exemplary embodiment, that the sixth direct current offset information is determined according to the difference value between the first direct current offset information and the fifth direct current offset information, and frequency calibration is performed for the radio frequency transmitting link according to the sixth direct current offset information in S406 includes that:
the frequency response information of the PGA HF, the PS and the PA in the radio frequency transmitting link is adjusted according to the sixth direct current offset information, so as to perform frequency calibration for the radio frequency transmitting link.

It is to be further noted that the PGA HF, the PS and the PA are arranged between the transmitting link frequency-mixing unit and the output unit of the radio frequency transmitting link. The frequency-mixing signal generated by the transmitting link mixer, for example, the third frequency-mixing signal, can be processed by the PGA HF, the PS and the PA before entering the output unit to generate the output signal.

In an exemplary embodiment, that the frequency response information of the PGA HF, the PS, and the PA in the radio frequency transmitting link is adjusted according to the sixth direct current offset information in S406 includes that:
the frequency response information of the PGA HF, the PS and the PA is adjusted to maximize the sixth direct current offset information.

In an exemplary embodiment, before the fifth direct current offset information of the radio frequency receiving link is obtained in S404, the frequency calibration method further includes that:
the output signal is obtained, and the output signal is sent to the input unit after performing attenuation processing on the output signal, so that the input unit inputs the third input signal according to the first input signal and the output signal.

It is to be further noted that the arrangement of the attenuator in the above exemplary embodiment can effectively avoid the damage to the radio frequency receiving link caused by the excessive voltage of the output signal.

Through the above description of implementations, those skilled in the art can clearly know that the frequency calibration method according to the above embodiments may be implemented by means of software plus a necessary common hardware platform, or by means of hardware; but in many cases, the former is the better implementation. Based on this understanding, the substance of the technical solution of the embodiments of the present disclosure or the part making a contribution to the conventional art can be embodied in the form of software product. The computer software product may be stored in a storage medium (for example, an ROM/RAM, a magnetic disk, and a compact disc) and may include a number of instructions to make a computer device (which can be a personal computer, a server or a network device, etc.) perform all or part of the frequency calibration method in each embodiment of the present disclosure.

Embodiment 5

The present embodiment also provides a frequency calibration device for a radio frequency receiving link, which is applied to the radio frequency receiving link in embodiment 1. The device is configured to implement the above embodiments and exemplary implementations. The embodiments which have been elaborated will not be repeated here. The term "module" used below can realize a combination of software and/or hardware with an intended function. Although the device described in the following embodiment is realized through software better, the realization through hardware or a combination of software and hardware is possible and conceived.

FIG. 12 is a structural block diagram of a frequency calibration device for a radio frequency receiving link provided according to an embodiment of the present disclosure. As shown in FIG. 12, the device includes: a first obtaining module 502, a second obtaining module 504, and a first calibration module 506.

The first obtaining module 502 is configured to obtain the first direct current offset information of the radio frequency receiving link. The first direct current offset information is direct current offset information in the radio frequency receiving link when the receiving link frequency-mixing unit generates the first frequency-mixing signal. The first frequency-mixing signal is a frequency-mixing signal obtained by the receiving link frequency-mixing unit according to the first input signal input by the input unit and the local oscillator signal generated by the clock unit.

The second obtaining module 504 is configured to obtain the second direct current offset information of the radio frequency receiving link. The second direct current offset information is direct current offset information in the radio frequency receiving link when the receiving link frequency-mixing unit generates the second frequency-mixing signal. The second frequency-mixing signal is a frequency-mixing signal generated by the receiving link frequency-mixing unit according to the second input signal and the local oscillator signal. The second input signal is input by the input unit according to the first input signal and the local oscillator signal.

The first calibration module 506 is configured to perform frequency calibration for the radio frequency receiving link according to the first direct current offset information and the second direct current offset information.

The other optional technical solutions and technical effects of the frequency calibration device for the radio frequency receiving link in the present embodiment correspond to that of the frequency calibration method for the radio frequency receiving link in embodiment 2, so elaborations are omitted herein.

In an exemplary embodiment, that frequency calibration is performed for the radio frequency receiving link according to the first direct current offset information and the second direct current offset information includes that:

the third direct current offset information is determined according to the difference value between the first direct current offset information and the second direct current offset information; and frequency calibration is performed for the radio frequency receiving link according to the third direct current offset information.

In an exemplary embodiment, that frequency calibration is performed for the radio frequency receiving link according to the first direct current offset information and the second direct current offset information further includes that:

the frequency response information of the LNA, the PS, and the PGA HF in the radio frequency receiving link is adjusted according to the third direct current offset information, so as to perform frequency calibration for the radio frequency receiving link.

In an exemplary embodiment, that the frequency response information of the LNA, the PS, and the PGA HF in the radio frequency receiving link is adjusted according to the third direct current offset information includes that:

the frequency response information of the LNA, the PS and the PGA HF is adjusted to maximize the third direct current offset information.

In an exemplary embodiment, before the second direct current offset information is obtained, the frequency calibration method further includes that:

the local oscillator signal is sent to the input unit after performing amplitude limiting processing on the local oscillator signal, so that the input unit inputs the second input signal according to the first input signal and the local oscillator signal.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

Embodiment 6

The present embodiment also provides a frequency calibration device for a radio frequency transceiving device, which is applied to the radio frequency transceiving device in embodiment 1. The device is configured to implement the above embodiments and exemplary implementations. The embodiments which have been elaborated will not be repeated here. The term "module" used below can realize a combination of software and/or hardware with an intended function. Although the device described in the following embodiment is realized through software better, the realization through hardware or a combination of software and hardware is possible and conceived.

FIG. 13 is a structural block diagram of a frequency calibration device for a radio frequency transceiving device provided according to an embodiment of the present disclosure. As shown in FIG. 13, the device includes: a third obtaining module 602, a fourth obtaining module 604 and a second calibration module 606.

The third obtaining module 602 is configured to obtain the first direct current offset information of the radio frequency receiving link. The first direct current offset information is direct current offset information in the radio frequency receiving link when the receiving link frequency-mixing unit generates the first frequency-mixing signal. The first frequency-mixing signal is a frequency-mixing signal obtained by the receiving link frequency-mixing unit according to the first input signal input by the input unit and the local oscillator signal generated by the clock unit.

The fourth obtaining module 604 is configured to obtain the fifth direct current offset information of the radio frequency receiving link. The fifth direct current offset information is direct current offset information in the radio frequency receiving link when the receiving link frequency-mixing unit generates the fourth frequency-mixing signal. The fourth frequency-mixing signal is the frequency-mixing signal generated by the receiving link frequency-mixing unit according to the third input signal and the local oscillator signal. The third input signal is input by the input unit according to the first input signal and the output signal output by the output unit in the radio frequency transmitting link. The output signal is obtained by the input unit according to the third frequency-mixing signal generated by the transmitting link frequency-mixing unit. The third frequency-mixing signal is the frequency-mixing signal generated by the transmitting link frequency-mixing unit according to the preset analog signal, the local oscillator signal and the preset fourth direct current offset information.

The second calibration module 606 is configured to perform frequency calibration for the radio frequency transmitting link according to the first direct current offset information and the fifth direct current offset information.

The other optional technical solutions and technical effects of the frequency calibration device for the radio frequency transceiving device in the present embodiment correspond to that of the frequency calibration method for the radio frequency transceiving device in embodiment 4, so elaborations are omitted herein.

In an exemplary embodiment, that frequency calibration is performed for the radio frequency transmitting link according to the first direct current offset information and the fifth direct current offset information includes that:

the sixth direct current offset information is determined according to the difference value between the first direct current offset information and the fifth direct current offset information, and frequency calibration is performed for the radio frequency transmitting link according to the sixth direct current offset information.

In an exemplary embodiment, that the sixth direct current offset information is determined according to the difference value between the first direct current offset information and the fifth direct current offset information, and frequency calibration is performed for the radio frequency transmitting link according to the sixth direct current offset information includes that:

the frequency response information of the PGA HF, the PS and the PA in the radio frequency transmitting link is adjusted according to the sixth direct current offset information, so as to perform frequency calibration for the radio frequency transmitting link.

In an exemplary embodiment, that the frequency response information of the PGA HF, the PS, and the PA in the radio frequency transmitting link is adjusted according to the sixth direct current offset information includes that:

the frequency response information of the PGA HF, the PS and the PA is adjusted to maximize the sixth direct current offset information.

In an exemplary embodiment, before the fifth direct current offset information of the radio frequency receiving link is obtained, the frequency calibration method further includes that:

the output signal is obtained, and the output signal is sent to the input unit after performing attenuation processing on the output signal, so that the input unit inputs the third input signal according to the first input signal and the output signal.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

Embodiment 7

The present embodiment also provides a computer-readable storage medium, in which a computer program is stored. The computer program is configured to perform, when running, the operations in any of the above method embodiments.

Optionally, in the present embodiment, the computer-readable storage medium may be configured to store a computer program for executing the following operations.

At S1, the first direct current offset information of the radio frequency receiving link is obtained. The first direct current offset information is direct current offset information in the radio frequency receiving link when the receiving link frequency-mixing unit generates the first frequency-mixing signal. The first frequency-mixing signal is a frequency-mixing signal obtained by the receiving link frequency-mixing unit according to the first input signal input by the input unit and the local oscillator signal generated by the clock unit.

At S2, the second direct current offset information of the radio frequency receiving link is obtained. The second direct current offset information is direct current offset information in the radio frequency receiving link when the receiving link frequency-mixing unit generates the second frequency-mixing signal. The second frequency-mixing signal is a frequency-mixing signal generated by the receiving link frequency-mixing unit according to the second input signal and the local oscillator signal. The second input signal is input by the input unit according to the first input signal and the local oscillator signal.

At S3, frequency calibration is performed for the radio frequency receiving link according to the first direct current offset information and the second direct current offset information.

Optionally, the specific examples in the present embodiment may refer to the examples described in the above embodiments and exemplary embodiments.

Optionally, in the present embodiment, the computer-readable storage media may include, but are not limited to, a USB flash disk, an ROM) an RAM, a mobile hard disk, a magnetic disk, a compact disc, and other media capable of storing the computer program.

Embodiment 8

The present embodiment also provides a computer-readable storage medium, in which a computer program is stored. The computer program is configured to perform, when running, the operations in any of the above method embodiments.

Optionally, in the present embodiment, the computer-readable storage medium may be configured to store a computer program for executing the following operations.

At S1, the first direct current offset information of the radio frequency receiving link is obtained. The first direct current offset information is direct current offset information in the radio frequency receiving link when the receiving link frequency-mixing unit generates the first frequency-mixing signal. The first frequency-mixing signal is a frequency-mixing signal obtained by the receiving link frequency-mixing unit according to the first input signal input by the input unit and the local oscillator signal generated by the clock unit.

At S2, the fifth direct current offset information of the radio frequency receiving link is obtained. The fifth direct current offset information is direct current offset information in the radio frequency receiving link when the receiving link frequency-mixing unit generates the fourth frequency-mixing signal. The fourth frequency-mixing signal is a frequency-mixing signal generated by the receiving link frequency-mixing unit according to the third input signal and the local oscillator signal. The third input signal is input by the input unit according to the first input signal and the output signal output by the output unit in the radio frequency transmitting link. The output signal is obtained by the input unit according to the third frequency-mixing signal generated by the transmitting link frequency-mixing unit. The third frequency-mixing signal is the frequency-mixing signal generated by the transmitting link frequency-mixing unit according to the preset analog signal, the local oscillator signal and the preset fourth direct current offset information.

At S3, frequency calibration is performed for the radio frequency transmitting link according to the first direct current offset information and the fifth direct current offset information.

Optionally, the specific examples in the present embodiment may refer to the examples described in the above embodiments and exemplary embodiments.

Optionally, in the present embodiment, the computer-readable storage media may include, but are not limited to, a USB flash disk, an ROM, an RAM, a mobile hard disk, a magnetic disk, a compact disc, and other media capable of storing the computer program.

Embodiment 9

The present embodiment also provides an electronic device, which includes a memory and a processor. The memory stores a computer program. The processor is configured to run the computer program to execute the operations in any of the above method embodiments.

Optionally, the electronic device may also include a transmission device and an input/output device. The transmission device is connected with the processor, and the input/output device is connected with the processor.

Optionally, in the present embodiment, the processor may be configured to execute the following operations through the computer program.

At S1, the first direct current offset information of the radio frequency receiving link is obtained. The first direct current offset information is direct current offset information in the radio frequency receiving link when the receiving link frequency-mixing unit generates the first frequency-mixing signal. The first frequency-mixing signal is a frequency-mixing signal obtained by the receiving link frequency-mixing unit according to the first input signal input by the input unit and the local oscillator signal generated by the clock unit.

At S2, the second direct current offset information of the radio frequency receiving link is obtained. The second direct current offset information is direct current offset information in the radio frequency receiving link when the receiving link frequency-mixing unit generates the second frequency-mixing signal. The second frequency-mixing signal is a frequency-mixing signal generated by the receiving link frequency-mixing unit according to the second input signal and the local oscillator signal. The second input signal is input by the input unit according to the first input signal and the local oscillator signal.

At S3, frequency calibration is performed for the radio frequency receiving link according to the first direct current offset information and the second direct current offset information.

Optionally, the specific examples in the present embodiment may refer to the examples described in the above embodiments and exemplary embodiments.

Embodiment 10

The present embodiment also provides an electronic device, which includes a memory and a processor. The memory stores a computer program. The processor is configured to run the computer program to execute the operations in any of the above method embodiments.

Optionally, the electronic device may also include a transmission device and an input/output device. The transmission device is connected with the processor, and the input/output device is connected with the processor.

Optionally, in the present embodiment, the processor may be configured to execute the following operations through the computer program.

At S1, the first direct current offset information of the radio frequency receiving link is obtained. The first direct current offset information is direct current offset information in the radio frequency receiving link when the receiving link frequency-mixing unit generates the first frequency-mixing signal. The first frequency-mixing signal is a frequency-mixing signal obtained by the receiving link frequency-mixing unit according to the first input signal input by the input unit and the local oscillator signal generated by the clock unit.

At S2, the fifth direct current offset information of the radio frequency receiving link is obtained. The fifth direct current offset information is direct current offset information in the radio frequency receiving link when the receiving link frequency-mixing unit generates the fourth frequency-mixing signal. The fourth frequency-mixing signal is a frequency-mixing signal generated by the receiving link frequency-mixing unit according to the third input signal and the local oscillator signal. The third input signal is input by the input unit according to the first input signal and the output signal output by the output unit in the radio frequency transmitting link. The output signal is obtained by the input unit according to the third frequency-mixing signal generated by the transmitting link frequency-mixing unit. The third frequency-mixing signal is the frequency-mixing signal generated by the transmitting link frequency-mixing unit according to the preset analog signal, the local oscillator signal and the preset fourth direct current offset information.

At S3, frequency calibration is performed for the radio frequency transmitting link according to the first direct current offset information and the fifth direct current offset information.

Optionally, the specific examples in the present embodiment may refer to the examples described in the above embodiments and exemplary embodiments.

It is apparent that those skilled in the art should appreciate that the above modules and operations in the embodiments of the present disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device; and in some situations, the presented or described operations may be executed in an order different from that described here; or they are made into integrated circuit modules, respectively; or multiple modules and operations of them are made into a single integrated circuit module for realization. Therefore, the embodiments of the present disclosure are not limited to any specific hardware and software combination.

The above is only the exemplary embodiments of the present disclosure and not intended to limit the present disclosure. For those skilled in the art, the present disclosure may have various modifications and changes. Any modifications, equivalent replacements, improvements and the like within the principle of the present disclosure should fall within the protection scope of the claims of the present disclosure.

INDUSTRIAL APPLICABILITY

The embodiments of the present disclosure are applied to the field of communications, and can solve the problem in the related art that receiving and transmitting links in radio frequency transceivers cannot implement efficient frequency calibration, so as to achieve efficient frequency calibration for radio frequency receiving and transmitting links in a process of simulation and test of a radio frequency transceiver chip.

What is claimed is:

1. A radio frequency receiving link, comprising:
an input unit, configured to input a first input signal;

a clock unit, configured to generate a local oscillator signal;

a receiving link frequency-mixing unit, configured to obtain the first input signal and the local oscillator signal, and generate a first frequency-mixing signal according to the first input signal and the local oscillator signal; and a calibration unit, configured to obtain first direct current offset information of the radio frequency receiving link, wherein the first direct current offset information is direct current offset information in the radio frequency receiving link when the receiving link frequency-mixing unit generates the first frequency-mixing signal;

wherein the receiving link frequency-mixing unit is further configured to obtain a second input signal and generate a second frequency-mixing signal according to the second input signal and the local oscillator signal, wherein the second input signal is input by the input unit according to the first input signal and the local oscillator signal; the calibration unit is further configured to obtain second direct current offset information of the radio frequency receiving link, and perform frequency calibration for the radio frequency receiving link according to the first direct current offset information and the second direct current offset information, wherein the second direct current offset information is direct current offset information in the radio frequency receiving link when the receiving link frequency-mixing unit generates the second frequency-mixing signal.

2. The radio frequency receiving link according to claim 1, wherein the calibration unit is further configured to:

determine third direct current offset information according to a difference value between the first direct current offset information and the second direct current offset information, and perform frequency calibration for the radio frequency receiving link according to the third direct current offset information.

3. The radio frequency receiving link according to claim 2, further comprising:

a Low Noise Amplifier (LNA), a Phase Shifter (PS), and a Programmable Gain Amplifier High Frequency (PGA HF);

wherein the LNA, the PS and the PGA HF are respectively arranged between the input unit and the receiving link frequency-mixing unit.

4. The radio frequency receiving link according to claim 3, wherein the calibration unit is further configured to:

adjust frequency response information of the LNA, the PS and the PGA HF according to the third direct current offset information, so as to perform frequency calibration for the radio frequency receiving link.

5. The radio frequency receiving link according to claim 4, wherein the calibration unit is further configured to:

adjust the frequency response information of the LNA, the PS and the PGA HF to maximize the third direct current offset information.

6. The radio frequency receiving link according to claim 1, wherein the calibration unit is further configured to:

obtain the local oscillator signal, and send the local oscillator signal to the input unit after performing amplitude limiting processing on the local oscillator signal, so that the input unit inputs the second input signal according to the first input signal and the local oscillator signal.

7. The radio frequency receiving link according to claim 1, further comprising:

an analog-to-digital conversion unit, configured to obtain the first frequency-mixing signal or the second frequency-mixing signal, and output a corresponding digital signal according to the first frequency-mixing signal or the second frequency-mixing signal.

8. A frequency calibration method for a radio frequency receiving link, applied to the radio frequency receiving link according to claim 1, the frequency calibration method comprising:

obtaining first direct current offset information of the radio frequency receiving link, wherein the first direct current offset information is direct current offset information in the radio frequency receiving link when a receiving link frequency-mixing unit generates a first frequency-mixing signal, and the first frequency-mixing signal is a frequency-mixing signal obtained by the receiving link frequency-mixing unit according to a first input signal input by an input unit and a local oscillator signal generated by a clock unit;

obtaining second direct current offset information of the radio frequency receiving link, wherein the second direct current offset information is direct current offset information in the radio frequency receiving link when the receiving link frequency-mixing unit generates a second frequency-mixing signal, the second frequency-mixing signal is a frequency-mixing signal generated by the receiving link frequency-mixing unit according to a second input signal and the local oscillator signal, and the second input signal is input by the input unit according to the first input signal and the local oscillator signal; and performing frequency calibration for the radio frequency receiving link according to the first direct current offset information and the second direct current offset information.

9. The frequency calibration method according to claim 8, wherein performing frequency calibration for the radio frequency receiving link according to the first direct current offset information and the second direct current offset information comprises:

determining third direct current offset information according to a difference value between the first direct current offset information and the second direct current offset information; and performing frequency calibration for the radio frequency receiving link according to the third direct current offset information.

10. The frequency calibration method according to claim 9, wherein performing frequency calibration for the radio frequency receiving link according to the first direct current offset information and the second direct current offset information further comprises:

adjusting frequency response information of a Low Noise Amplifier (LNA), a Phase Shifter (PS), and a Programmable Gain Amplifier High Frequency (PGA HF) in the radio frequency receiving link according to the third direct current offset information, so as to perform frequency calibration for the radio frequency receiving link.

11. A radio frequency transceiving device, comprising: a radio frequency receiving link and a radio frequency transmitting link, wherein the radio frequency receiving link comprises:

an input unit, configured to input a first input signal; a clock unit, configured to generate a local oscillator signal; a receiving link frequency-mixing unit, configured to obtain the first input signal and the local oscillator signal, and generate a first frequency-mixing signal according to the first input signal and the local oscillator signal; and a calibration unit, configured to obtain first direct current offset information of the radio frequency receiving link, wherein the first direct current offset information is direct current offset information in the radio frequency receiving link when the receiving link frequency-mixing unit generates the first frequency-mixing signal;

the radio frequency transmitting link comprises:

a transmitting link frequency-mixing unit, configured to obtain a preset analog signal, the local oscillator signal and preset fourth direct current offset information, and generate a third frequency-mixing signal according to the analog signal, the local oscillator signal and the fourth direct current offset information; and an output unit, configured to obtain an output signal according to the third frequency-mixing signal, and send the output signal to the input unit in the radio frequency receiving link;

wherein the receiving link frequency-mixing unit is further configured to obtain a third input signal and generate a fourth frequency-mixing signal according to the third input signal and the local oscillator signal, wherein the third input signal is input by the input unit according to the first input signal and the output signal; the calibration unit is further configured to obtain fifth direct current offset information of the radio frequency receiving link, and perform frequency calibration for the radio frequency transmitting link according to the first direct current offset information and the fifth direct current offset information, wherein the fifth direct current offset information is direct current offset information in the radio frequency receiving link when the receiving link frequency-mixing unit generates the fourth frequency-mixing signal.

12. The radio frequency transceiving device according to claim 11, wherein the calibration unit is further configured to:

determine sixth direct current offset information according to a difference value between the first direct current offset information and the fifth direct current offset information, and perform frequency calibration for the radio frequency transmitting link according to the sixth direct current offset information.

13. The radio frequency transceiving device according to claim 12, wherein the radio frequency transmitting link further comprises:

a Programmable Gain Amplifier High Frequency (PGA HF), a Phase Shifter (PS) and a Power Amplifier (PA);

wherein the PGA HF, the PS and the PA are respectively arranged between the transmitting link frequency-mixing unit and the output unit.

14. The radio frequency transceiving device according to claim 13, wherein the calibration unit is further configured to:

adjust frequency response information of the PGA HF, the PS and the PA according to the sixth direct current offset information, so as to perform frequency calibration for the radio frequency transmitting link.

15. The radio frequency transceiving device according to claim 14, wherein the calibration unit is further configured to:

adjust the frequency response information of the PGA HF, the PS and the PA to maximize the sixth direct current offset information.

16. The radio frequency transceiving device according to claim 11, wherein the calibration unit is further configured to:

obtain the output signal, and send the output signal to the input unit after performing attenuation processing on the output signal, so that the input unit inputs the third input signal according to the first input signal and the output signal.

17. The radio frequency transceiving device according to claim 11, further comprising:

a Digital-to-Analog Conversion (ADC) unit, configured to provide the preset analog signal to the transmitting link frequency-mixing unit.

18. A frequency calibration method for a radio frequency transceiving device, applied to the radio frequency transceiving device according to claim 11, the frequency calibration method comprising:

obtaining first direct current offset information of a radio frequency receiving link, wherein the first direct current offset information is direct current offset information in the radio frequency receiving link when a receiving link frequency-mixing unit generates a first frequency-mixing signal, and the first frequency-mixing signal is a frequency-mixing signal obtained by the receiving link frequency-mixing unit according to a first input signal input by an input unit and a local oscillator signal generated by a clock unit;

obtaining fifth direct current offset information of the radio frequency receiving link, wherein the fifth direct current offset information is direct current offset information in the radio frequency receiving link when the receiving link frequency-mixing unit generates a fourth frequency-mixing signal; the fourth frequency-mixing signal is a frequency-mixing signal generated by the receiving link frequency-mixing unit according to the third input signal and the local oscillator signal; the third input signal is input by the input unit according to the first input signal and an output signal output by an output unit in a radio frequency transmitting link; the output signal is obtained by the input unit according to a third frequency-mixing signal generated by a transmitting link frequency-mixing unit; the third frequency-mixing signal is a frequency-mixing signal generated by the transmitting link frequency-mixing unit according to a preset analog signal, the local oscillator signal and preset fourth direct current offset information;

performing frequency calibration for the radio frequency transmitting link according to the first direct current offset information and the fifth direct current offset information.

19. The frequency calibration method according to claim 18, wherein performing frequency calibration for the radio frequency transmitting link according to the first direct current offset information and the fifth direct current offset information comprises:

determining sixth direct current offset information according to a difference value between the first direct current offset information and the fifth direct current offset information, and performing frequency calibration for the radio frequency transmitting link according to the sixth direct current offset information.

20. The frequency calibration method according to claim 19, wherein determining the sixth direct current offset information according to the difference value between the first direct current offset information and the fifth direct current offset information, and performing frequency calibration for the radio frequency transmitting link according to the sixth direct current offset information comprises:
adjusting frequency response information of a Programmable Gain Amplifier High Frequency (PGA HF), a Phase Shifter (PS) and a Power Amplifier (PA) in the radio frequency transmitting link according to the sixth direct current offset information, so as to perform frequency calibration for the radio frequency transmitting link.

\* \* \* \* \*